(12) United States Patent
Hongu et al.

(10) Patent No.: US 12,432,442 B2
(45) Date of Patent: Sep. 30, 2025

(54) CONTROL APPARATUS, CONTROL METHOD, IMAGE PICKUP APPARATUS, AND STORAGE MEDIUM

(71) Applicant: CANON KABUSHIKI KAISHA, Tokyo (JP)

(72) Inventors: Hideyasu Hongu, Kanagawa (JP); Toshihiko Tomosada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 18/345,035

(22) Filed: Jun. 30, 2023

(65) Prior Publication Data

US 2024/0015390 A1 Jan. 11, 2024

(30) Foreign Application Priority Data

Jul. 7, 2022 (JP) .................................. 2022-109427

(51) Int. Cl.
*H04N 23/63* (2023.01)
(52) U.S. Cl.
CPC ......... *H04N 23/635* (2023.01); *H04N 23/632* (2023.01)

(58) Field of Classification Search
CPC .... H04N 23/635; H04N 23/632; H04N 23/69; H04N 23/695; H04N 23/672; H04N 23/663; H04N 23/675
See application file for complete search history.

(56) References Cited

U.S. PATENT DOCUMENTS

| | | | |
|---|---|---|---|
| 2006/0104623 A1* | 5/2006 | Sasaki | H04N 23/635 348/E5.045 |
| 2016/0309089 A1* | 10/2016 | Hongu | H04N 23/61 |

FOREIGN PATENT DOCUMENTS

| | | | |
|---|---|---|---|
| JP | 2010-097167 | A | 4/2010 |
| JP | 2013-061408 | A | 4/2013 |
| JP | 6537325 | B2 | 7/2019 |
| JP | 2021-105734 | A | 7/2021 |
| JP | 2021-117469 | A | 8/2021 |

\* cited by examiner

*Primary Examiner* — Yogesh K Aggarwal
(74) *Attorney, Agent, or Firm* — Cowan, Liebowitz & Latman, P.C.

(57) ABSTRACT

A control apparatus is configured to control a display unit configured to superimpose and display a captured image captured by an image sensor and display items indicating in-focus degrees of a plurality of focus detecting areas in the captured image. The control apparatus includes a memory that stores a set of instructions, and at least one processor that executes the set of instructions to change a display state of the display items according to a state of a manual focus operation by a user.

19 Claims, 16 Drawing Sheets

FIG. 13

| AF FRAME DISPLAY MENU | DURING AF<br>(1) NOTIFY OBJECT OF AF TARGET | FOCUSING OPERATION DURING AF<br>(2) NOTIFY AF TARGET AREA WHEN MF OPERATION IS STOPPED<br>(3) DISPLAY MF ASSISTING FRAMES FOR MF OPERATION |
|---|---|---|
| (A) LIMITED DISPLAY OF AF ASSISTING FRAMES | DISPLAY (IN-FOCUS) AF ASSISTING FRAMES ONLY IN AF TARGET AREA | NOTIFY AF TARGET AREA BY DISPLAYING MF ASSISTING FRAMES ONLY IN AF TARGET AREA |
| (B) DISPLAY OF CONNECTED AF ASSISTING FRAME | DISPLAY (IN-FOCUS) CONNECTED AF ASSISTING FRAME IN AF TARGET AREA | DISPLAY CONNECTED AF ASSISTING FRAME IN AF TARGET AREA AND MF ASSISTING FRAMES IN ENTIRE AREA |
| (C) FULL DISPLAY OF AF ASSISTING FRAMES | FULLY DISPLAY (IN-FOCUS) AF ASSISTING FRAMES | FULLY DISPLAY MF ASSISTING FRAMES AND DISPLAY AF ASSISTING FRAMES WITH DIFFERENT SHAPES FOR NOTIFICATION |

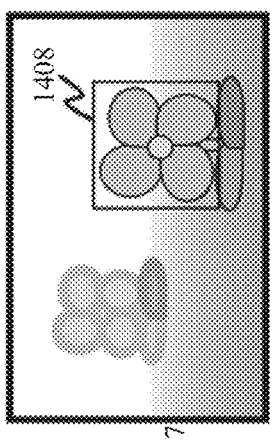
FIG. 14A
DURING AF
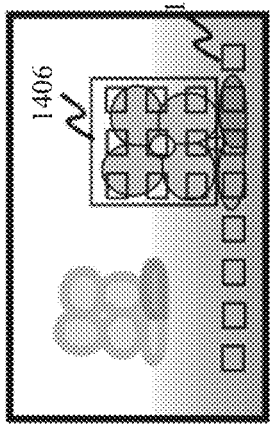
FIG. 14B
MF OPERATION STARTS
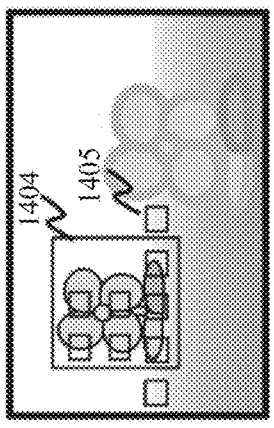
FIG. 14C
MF OPERATION ENDS
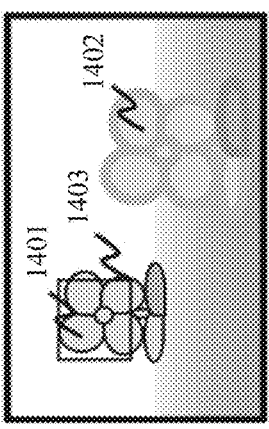
FIG. 14D
AF RESUMES
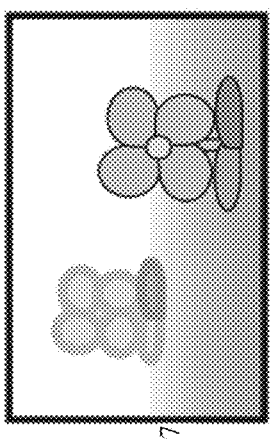
FIG. 14E
IN CASE OF NON-DISPLAY OF AF FRAME
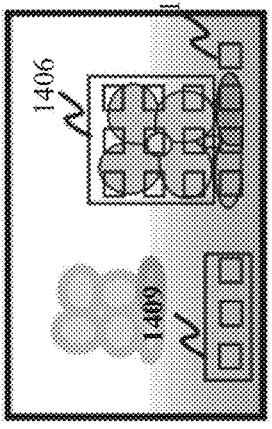
FIG. 14F
IN CASE OF DISPLAY OF AF SUBFRAMES
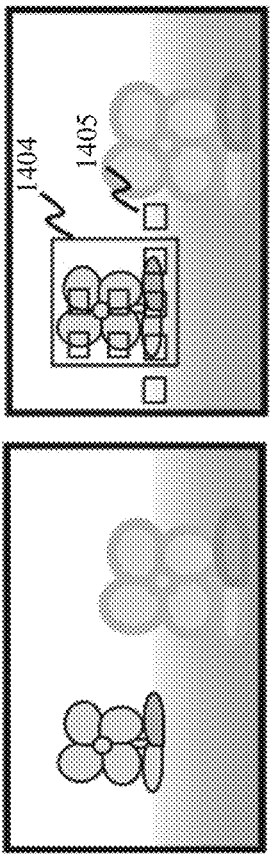
FIG. 14G
FIG. 14H
IN CASE OF NON-DISPLAY OF AF FRAME

CONTROL APPARATUS, CONTROL METHOD, IMAGE PICKUP APPARATUS, AND STORAGE MEDIUM

BACKGROUND

Technical Field

One of the aspects of the embodiments relates to a control apparatus, a display control method, and a storage medium.

Description of Related Art

A display apparatus that displays a focus state of an object (an in-focus state, a front focus state, a rear focus state, or a defocus degree) based on a focus evaluation value of the object has recently been proposed as a focus assisting function in a manual focus (MF) operation.

Japanese Patent No. 6537325 discloses a display control apparatus configured to display an area having a predetermined size for calculating a focus evaluation value around a user specified position as a center on an imaging screen (image), and a guide index that indicates a focus state based on the focus evaluation value in this area. Japanese Patent Laid-Open No. 2021-117469 discloses a display control apparatus that displays an in-focus area (in-focus frame) on the imaging screen during autofocus (AF). Japanese Patent Laid-Open No. 2010-97167 discloses an AF apparatus that displays an AF frame by setting an object located at the best focus position to an AF target at the end of a focusing operation, and starts automatically tracking the object.

The display control apparatus disclosed in Japanese Patent No. 6537325 cannot recognize a focus state of the entire imaging screen or an area other than a predetermined area around the user specified position as the center. Therefore, in a case where the object is moving or there are a plurality of objects, focusing by the MF operation is difficult. The display control apparatus disclosed in Japanese Patent Laid-Open No. 2021-117469 has difficulty in focusing because the distance and direction to the in-focus position are unknown, and if many focusing frames are displayed on the object, it becomes difficult to confirm the focus state of the object. The AF apparatus disclosed in Japanese Patent Laid-Open No. 2010-97167 has difficulty in providing the object with the best focus state.

SUMMARY

One of the aspects of the embodiments provides a control apparatus that can achieve both improved focusing operability during an MF operation and secured the visibility during focus confirmation of an object.

A control apparatus according to one aspect of the disclosure is configured to control a display unit. The display unit is configured to superimpose and display a captured image captured by an image sensor and display items indicating in-focus degrees of a plurality of focus detecting areas in the captured image. The control apparatus includes a memory that stores a set of instructions, and at least one processor that executes the set of instructions to change a display state of the display items according to a state of a manual focus operation by a user. A control method corresponding to the above control apparatus also constitutes another aspect of the disclosure. A storage medium storing a program that causes a computer to execute the above control method also constitutes another aspect of the disclosure. An image pickup apparatus having the above control apparatus also constitutes another aspect of the disclosure.

Further features of the disclosure will become apparent from the following description of embodiments with reference to the attached drawings.

BRIEF DESCRIPTION OF THE DRAWINGS

FIG. 13 explains an AF frame displaying menu according to this embodiment.

FIGS. 14A to 14H explain the AF assisting frame and the MF assisting frame in this embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
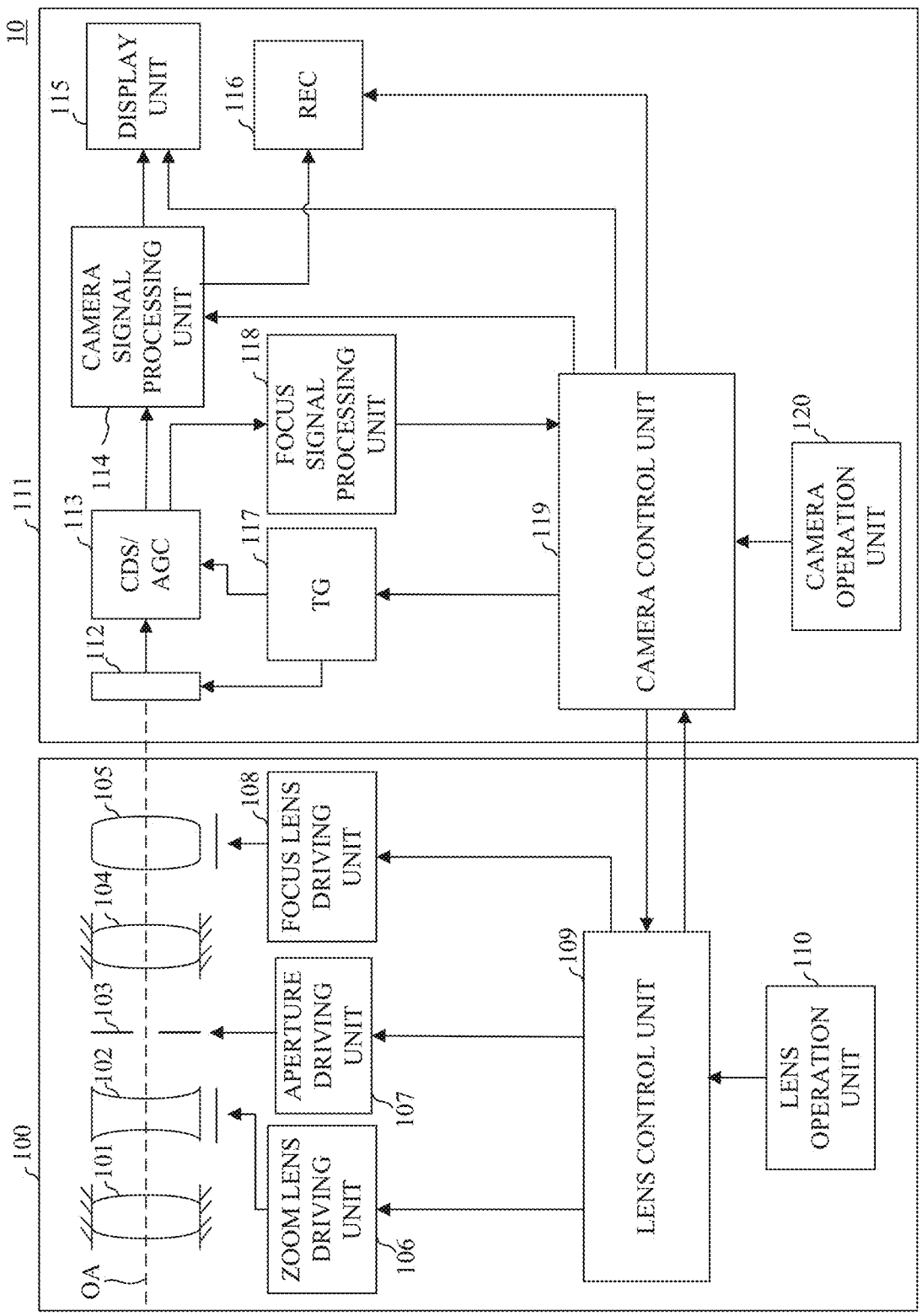
FIG. 1 is a block diagram of an imaging system according to this embodiment.

Referring now to FIG. 1, a description will be given of an imaging system according to this embodiment. FIG. 1 is a block diagram of the imaging system 10. The imaging system 10 has a focus assisting displaying function as described below. As illustrated in FIG. 1, the imaging system 10 includes a camera body (image pickup apparatus) 111 and a lens unit (lens apparatus) 100 attachable to and detachable from the camera body 111. A lens control unit 109 that controls the overall operation of the lens unit 100 and a camera control unit 119 (control apparatus) that controls the overall operation of the imaging system 10 can communicate data with each other.

In this embodiment, the camera control unit 119 is a control unit having a processor such as a CPU or MPU (processor) and a storage unit such as a memory. The camera control unit 119 may also have a calculation circuit (processor), and may execute some of calculation functions performed by the processor using the calculation circuit. In this embodiment, the lens unit 100 is an interchangeable lens attachable to and detachable from the camera body 111. However, this embodiment is not limited to this example and is applicable to an image pickup apparatus in which the lens unit and the camera body are integrated.

A description will now be given of the configuration of the lens unit 100. The lens unit 100 includes an imaging optical system that includes a first fixed lens 101, a zoom lens (magnification varying lens) 102, a diaphragm (aperture stop) 103, a second fixed lens 104, and a focus lens 105. An image (optical image) of the object is formed by the imaging optical system. The zoom lens 102 is a lens movable in a direction along the optical axis OA (optical axis direction) to perform a magnification varying (zooming) operation, and is driven by a zoom lens driving unit 106 for zooming. The focus lens 105 serves to correct movement of the focal plane caused by zooming and to provide a focusing function, and is driven by a focus lens driving unit 108 for focusing. The diaphragm 103 is driven by an aperture driving unit 107 to control a light amount incident on an image sensor 112, which will be described below.

The zoom lens driving unit 106, the aperture driving unit 107, and the focus lens driving unit 108 are controlled by the lens control unit 109, which controls the aperture diameter in the diaphragm 103 and the positions of the zoom lens 102 and the focus lens 105. In a case where the user operates a focus ring, a zoom ring, or the like (not illustrated) provided in the lens operation unit 110 to perform the focusing or zooming operation, the lens control unit 109 performs control according to the user operation. The lens control unit 109 controls the aperture driving unit 107, the zoom lens driving unit 106, and the focus lens driving unit 108 according to the control command and control information received from the camera control unit 119, and transmits lens information to the camera control unit 119.

A description will now be given of the configuration of the camera body 111 having the focus assisting function according to this embodiment. In the camera body 111, the image sensor 112 includes a CCD sensor or a CMOS sensor, and a light beam that has passed through the imaging optical system in the lens unit 100 forms an image on a light receiving plane (imaging plane) of the image sensor 112. Then, the formed object image is photoelectrically converted into charges according to an incident light amount by the photodiodes (photoelectric conversion units) of the image sensor 112 and accumulated. The charges accumulated in each photodiode are sequentially read out from the image sensor 112 as a voltage signal corresponding to the charge based on the driving pulse given from a timing generator (TG) 117 in accordance with the command from the camera control unit 119. The detailed configuration of the image sensor 112 will be described below, but the image sensor 112 in this embodiment can output a pair of focusing signals for focus detection by the imaging-plane phase-difference method in addition to normal imaging signals.

The imaging signal and focus signal read out from the image sensor 112 are input to a Correlated Double Sampling (CDS)/Auto Gain Control (AGC) circuit 113 to perform correlated double sampling for removing reset noises, gain control, and signal digitization. The CDS/AGC circuit 113 outputs the processed imaging signal to a camera signal processing unit 114 and the focus signal to a focus signal processing unit 118.

The camera signal processing unit 114 performs various image processing for an imaging signal output from the CDS/AGC circuit 113 and generates a video signal. A display unit 115 is a display apparatus such as LCD or organic EL, and displays an image based on the video signal output from the camera signal processing unit 114. The display unit 115 superimposes and displays a focus assisting frame (display item indicating the in-focus degree) according to this embodiment on the screen (image). That is, the display unit 115 superimposes and displays the captured image captured by the image sensor 112 and the display item indicating the in-focus degree of the plurality of focus detection areas in the captured image. Details of the focus assisting frame will be described below. In this embodiment, the display unit 115 is included in the camera body 111, but the disclosure is not limited to this embodiment, and the display unit may be a display apparatus such as a television monitor connected as an external device to the camera body 111. In a recording mode for recording the imaging signal, the imaging signal is sent from the camera signal processing unit 114 to a recorder (REC) 116 and recorded on a recording medium such as an optical disc, a semiconductor memory, or a magnetic tape.

The focus signal processing unit 118 performs correlation calculation based on the pair of focus signals output from the CDS/AGC circuit 113 and detects the focus state. In this embodiment, the focus signal processing unit 118 calculates a correlation amount, a defocus amount, and reliability information (two-image matching degree, two-image steepness degree, contrast information, saturation information, flaw information, etc.). The focus signal processing unit 118 then outputs a calculated defocus amount and reliability information to the camera control unit 119. Based on the defocus amount or the reliability information acquired from the focus signal processing unit 118, the camera control unit 119 notifies the focus signal processing unit 118 of changes in settings for calculating them.

The camera control unit 119 control each component in the camera body 111 by exchanging information with it. The camera control unit 119 controls processing within the camera body 111, powering on and off, changes in imaging settings and display settings, and recording of data according to input from the camera operation unit 120 operated by the user. The camera control unit 119 executes various functions according to user operations such as AF/MF control switching and recorded video confirmation. The camera control unit 119 communicates information with the lens control unit 109 in the lens unit 100, transmits a control command and control information for the imaging optical system, and acquires information in the lens unit 100, as described above. As will be described below, the camera control unit 119 changes the display state of display items in accordance with the MF operation of the user.

In this embodiment, the display control apparatus may include at least the display unit 115 and the camera control unit 119.

Figure 2:
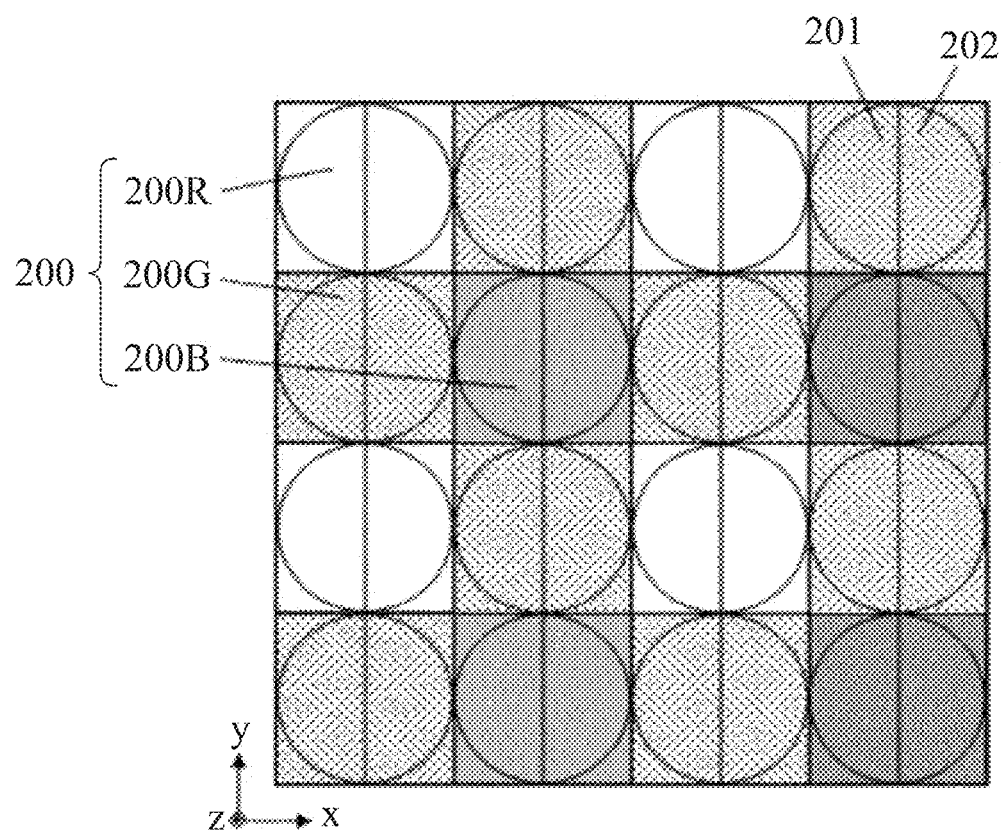
FIG. 2 is a pixel array diagram on an image sensor according to this embodiment.

Referring now to FIG. 2, a description will be given of the pixel array of the image sensor 112 in this embodiment. FIG. 2 is a pixel array diagram of the image sensor 112 and illustrates a range of 4 columns×4 rows of imaging pixels (8 columns×4 rows for the array of focus detecting pixels) as the pixel array of the two-dimensional CMOS sensor for the image sensor 112.

This embodiment assumes that a pixel unit 200 consists of 2 columns×2 rows of pixels and covered with color filters in a Bayer array. In the pixel unit 200, a pixel unit 200R having R (red) spectral sensitivity is located at the upper left position, pixel units 200G having G (green) spectral sensitivity are located at the upper right and lower left positions, and a pixel unit 200B having B (blue) spectral sensitivity is located at the lower right position.

Since the image sensor 112 performs focus detection using the imaging-plane phase-difference method, each pixel in the image sensor 112 holds a plurality of photodiodes (photoelectric converters) for a single microlens (not illustrated). In this embodiment, each pixel includes two photodiodes 201 and 202 arranged in 2 columns×1 row. The image sensor 112 can acquire an imaging signal and a focus signal by arranging a large number of pixel units 200 each consisting of 4 columns×4 rows of pixels (8 columns×4 rows of photodiodes) illustrated in FIG. 2.

In each pixel having such a configuration, a light beam is separated by a microlens and imaged on photodiodes 201 and 202. A signal (A+B signal) obtained by adding the signals from the two photodiodes 201 and 202 is used as an imaging signal, and two signals (A and B image signals) read out of the individual photodiodes 201 and 202 are used as focusing signals. The imaging signal and the focusing signal may be read out separately, but this embodiment may perform as follows based on the processing load. That is, this example may read out the imaging signal (A+B signal) and one of the focusing signals (such as A signal) of the photodiodes 201 and 202, calculate a difference, and acquire the other focusing signal (such as B signal).

In this embodiment, each pixel has two photodiodes 201 and 202 for a single microlens, but the number of photodiodes is not limited to two, and may be more. A plurality of pixels having different opening positions of the light receiving portions relative to the microlens may be provided. In other words, any configuration may be used as long as two phase-difference detecting signals such as an A image signal and a B image signal, which can provide phase difference detection, are obtained as a result. This embodiment is not limited to the configuration in which every pixel has a plurality of photodiodes as illustrated in FIG. 2. The configuration illustrated in FIG. 2 in which focus detecting pixels are discretely provided may be employed in normal pixels on the image sensor 112.

Figure 3:
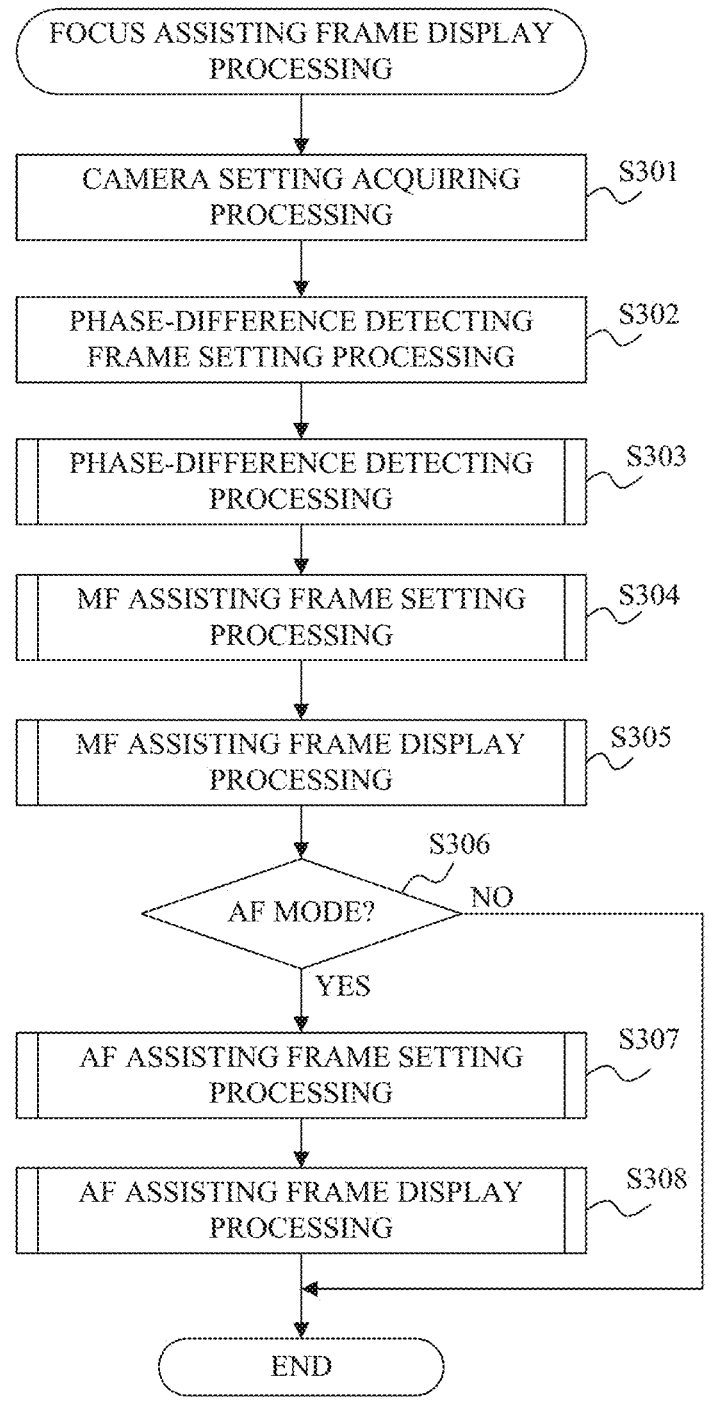
FIG. 3 is a flowchart illustrating focus assisting frame display processing in this embodiment.

Referring now to FIGS. 3 to 10, a description will be given of display processing of the focus assisting frame (display item indicating the in-focus degree) executed by the camera control unit 119 according to this embodiment. FIG. 3 is a flowchart illustrating the overall sequence of focus assisting frame display processing executed by the camera control unit 119. The processing of steps S301 to S308 described below is periodically executed based on the operation cycle of the camera body 111.

First, in step S301, the camera control unit 119 acquires various camera settings such as imaging settings, display settings, AF/MF mode settings, etc. that have been changed according to inputs from the camera operation unit 120 operated by the user. In this embodiment, the camera operation unit 120 acquires, as camera settings, settings relating to the display of a focus assisting frame or a focus assisting subframe, which will be described below, for display during MF. For example, camera settings can be changed such as a setting of whether or not to always display the focus assisting frame or focus assisting subframe, a setting of whether or not to display the focus assisting frame or focus assisting subframe only during user operation, or a display method (frame color, shape, and size, frame display range). After step S302, the camera control unit 119 performs processing according to the acquired camera setting. The camera control unit 119 can set three patterns of the AF frame display menu in FIG. 13 for the display during AF. Details of this will be described below with reference to FIG. 13.

Next, in step S302, the camera control unit 119 performs phase-difference detecting frame setting processing. The phase-difference detecting frame setting processing is setting processing of a detecting frame for acquiring a signal that is used for focus detection in the imaging-plane phase-difference method. Details of the setting position of the phase-difference detecting frame will be described below with reference to FIGS. 4A, 4B, and 4C. The description of this embodiment assumes that a plurality of phase-difference detecting frames are internally set by dividing a predetermined phase-difference detecting range into grid-like areas, but the disclosure is not limited to this example. The phase-difference detecting range may set a size range according to the camera setting acquired in step S301 around a position as a center specified by the user through a touch operation or the like.

Next, in step S303, the camera control unit 119 performs phase-difference detecting processing. In the phase-difference detecting processing, the camera control unit 119 performs focus detection using the imaging-plane phase-difference method for the set phase-difference detecting frames, and calculates a detection result, such as a shift amount (defocus amount) to an in-focus position and a shift direction (defocus direction) based on the focus detection result. Details of the phase-difference detecting processing will be described below with reference to FIG. 5.

Next, in step S304, the camera control unit 119 performs setting processing of a frame for assisting focusing in the MF operation (MF assisting frame, display item indicating the in-focus degree) based on the detection result of the phase-difference detecting processing in step S303. Next, in step S305, the camera control unit 119 performs processing to superimpose and display the MF assisting frame set in step S304 on a captured image displayed on the display unit 115. Details of steps S304 and S305 will be described below with reference to FIGS. 6 and 7. Focusing on an object as an imaging target can become easier by visually displaying the MF assisting frame or the MF assisting subframe on the display unit 115 such as a monitor based on the acquired phase-difference detecting result, and by explicitly indicating an in-focus area of the camera body 111 to the user.

Next, in step S306, the camera control unit 119 determines whether or not the mode is the AF mode according to the state of the focus switch (not illustrated) in the lens operation unit 110 of the lens unit 100 or the camera operation unit 120 of the camera body 111. In a case where the camera control unit 119 determines that the mode is the AF mode, the flow proceeds to step S307. In a case where the camera control unit 119 determines that the mode is not the AF mode (the mode is the MF mode), this flow ends.

In step S307, the camera control unit 119 performs setting processing of a frame (AF assisting frame) for assisting smooth transition from the MF operation to the AF operation based on the detection result of the phase-difference detecting processing in step S303. Next, in step S308, the camera control unit 119 performs processing to superimpose and display the AF assisting frame set in step S307 on the display unit 115.

Details of steps S307 and S308 will be described with reference to FIGS. 11 to 15E. This embodiment visually displays the AF assisting frame, the AF assisting subframe, or the like set based on the acquired phase-difference detecting result on the display unit 115 such as a monitor, and explicitly indicates to the user a focusing area in the AF control performed by the camera control unit 119. Thereby, in a case where the AF control takes over the MF operation, this configuration enables which object the AF control will start focusing on to be easily recognized.

Figure 4A:
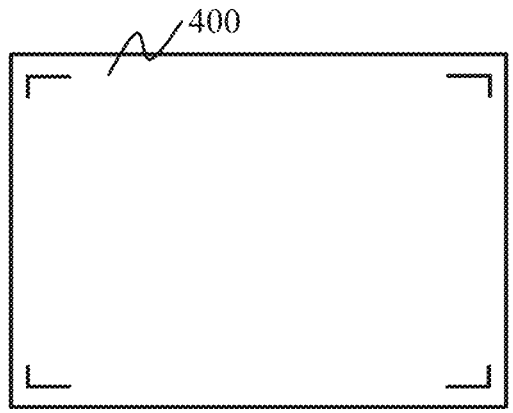
FIGS. 4A, 4B, and 4C explain phase-difference detecting frame setting processing according to this embodiment.
Figure 4B:
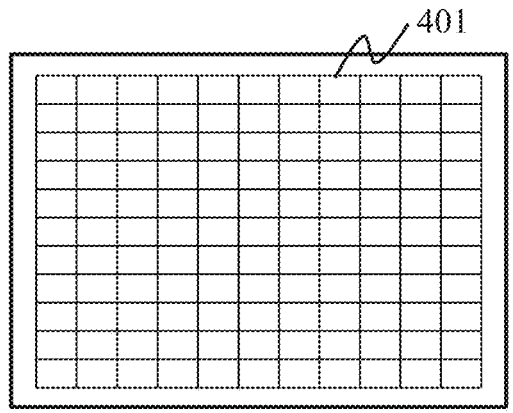
Figure 4C:
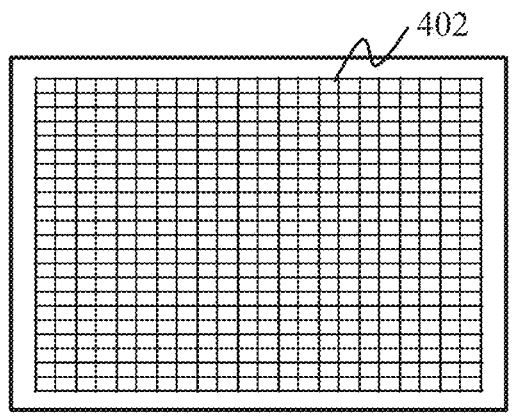

Referring now to FIGS. 4A, 4B, and 4C, a description will be given of the phase-difference detecting frame setting processing in step S302 of FIG. 3. FIGS. 4A, 4B, and 4C explain the phase-difference detecting frame setting processing. FIG. 4A illustrates a phase-difference detecting area 400 disposed in the pixel areas on the image sensor 112. The phase-difference detecting area 400 is an area in which the camera body 111 performs focus detection. The description of this embodiment assumes that the phase-difference detecting area 400 is not explicitly displayed on the screen, but the frame may be displayed on the screen so that the user can check it on a monitor or the like. While FIG. 4A illustrates that the target is limited to the center portion of the pixel area on the image sensor 112, the entire pixel area of the image sensor 112 may be targeted.

Phase-difference detecting frames 401 illustrated in FIG. 4B are set so that detecting frames divided into N×M (11×11 in this embodiment) are arranged adjacent to each other inside the phase-difference detecting area 400. However, this embodiment is not limited to this example. Neighboring detecting frames may be spaced by a certain distance, or may be set so that the detecting frames partially overlap each other. For example, without changing the size (height and width) of the phase-difference detecting frame 401, neighboring detecting frames may overlap each other by ½ of the size of one frame in the left, right, up, and down directions. In this case, similarly to phase-difference detecting frames 402 illustrated in FIG. 4C, the number of divisions inside the phase-difference detecting area 400 can be substantially 22×22.

Figure 5:
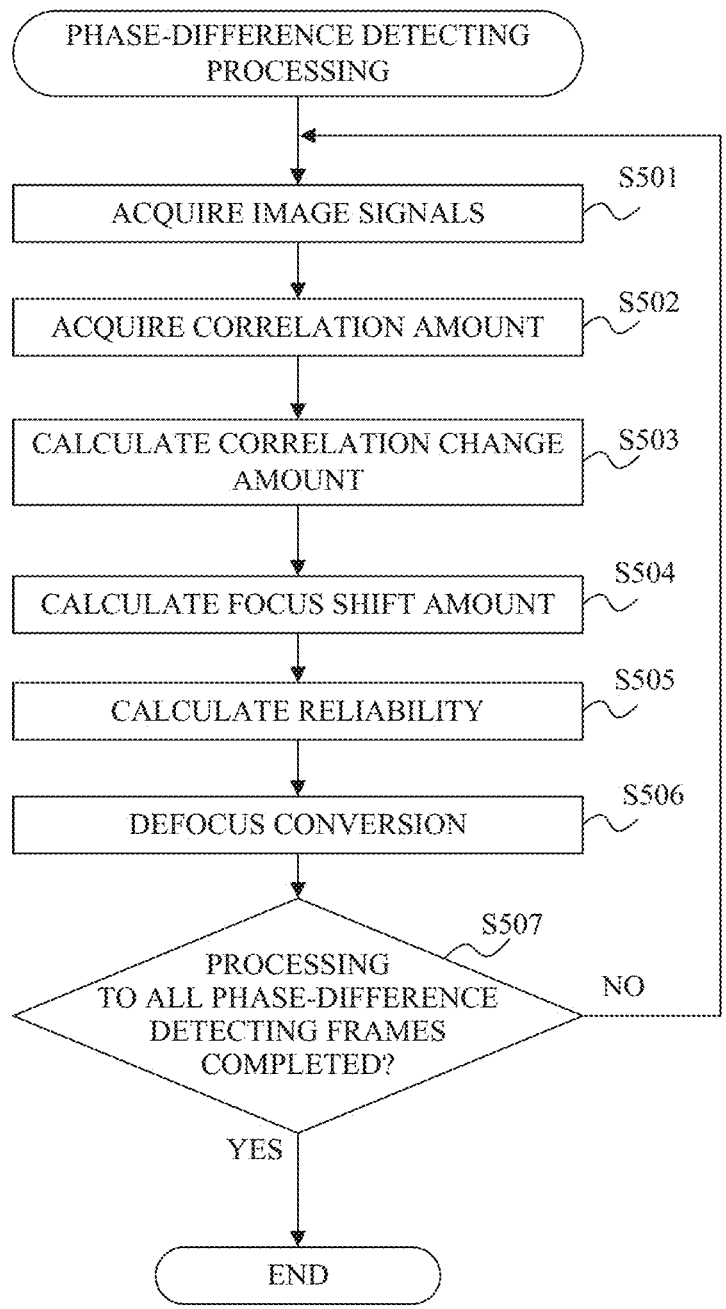
FIG. 5 is a flowchart illustrating phase-difference detecting processing according to this embodiment.

Referring now to FIG. 5, a description will be given of the phase-difference detecting processing in step S303 of FIG. 3. FIG. 5 is a flowchart illustrating the phase-difference detecting processing. First, in step S501, the camera control unit 119 acquires a pair of image signals for each phase-difference detecting frame 401 placed in the phase-difference detecting area 400 set in step S302. Next, in step S502, the camera control unit 119 calculates a correlation amount between the pair of image signals acquired in step S501. Next, in step S503, the camera control unit 119 calculates a correlation change amount based on the correlation amount calculated in step S502. Next, in step S504, the camera control unit 119 calculates a focus shift amount based on the correlation change amount calculated in step S503. Next, in step S505, the camera control unit 119 calculates reliability indicating how reliable the focus shift amount calculated in step S504 is. As described above, the reliability is a value calculated based on the two-image matching degree or the two-image steepness degree of the image signals.

Next, in step S506, the camera control unit 119 converts the focus shift amount calculated in step S504 into a defocus amount. Next, in step S507, the camera control unit 119 determines whether or not the processing of steps S501 to S506 has been completed for all the 121 phase-difference detecting frames set in step S302. In a case where the processing for all the phase-difference detecting frames has not been completed, the flow returns to step S501, and steps S501 to S506 are repeated. On the other hand, in a case where the processing for all the phase-difference detecting frames is completed, this flow ends.

Figure 6:
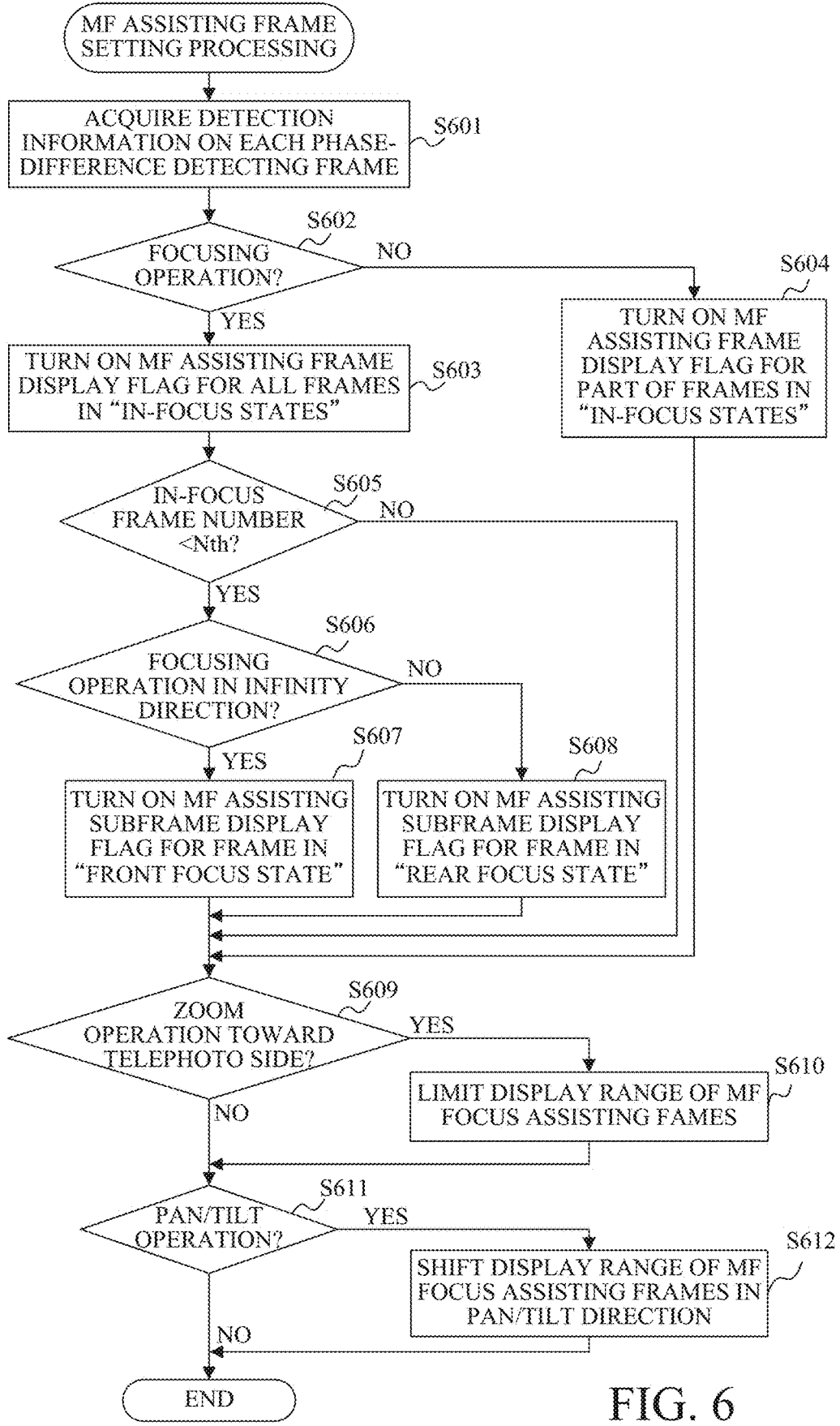
FIG. 6 is a flowchart illustrating MF assisting frame setting processing according to this embodiment.

Referring now to FIGS. 6 to 10, a detailed description will be given of the processing for displaying the MF assisting frame. FIG. 6 is a flowchart illustrating the MF assisting frame setting processing in step S304 of FIG. 3.

First, in step S601, the camera control unit 119 acquires detection information on each phase-difference detecting frame. Here, the detection information on each phase-difference detecting frame includes a focus state determined based on the reliability, defocus amount, and defocus direction calculated for each phase-difference detecting frame described with reference to FIG. 5. The focus state includes at least three states: an "in-focus state" indicating that the object is in focus, and a "front focus state" and a "rear focus state," which are slightly out of focus, and are different in shifting direction from the in-focus position. For example, the camera control unit 119 determines the focus state based on whether the calculated reliability is high, and the calculated defocus amount is smaller than an in-focus determination threshold (which is a defocus amount obtained by multiplying a defocus amount corresponding to a depth of field by a predetermined ratio). In a case where the defocus amount is smaller than the in-focus determination threshold, the camera control unit 119 determines the focus state to be the "in-focus state." This embodiment sets the predetermined ratio to 2, and the defocus amount that is twice as large as the depth of field to the in-focus determination threshold. In a case where the defocus amount larger than the in-focus determination threshold appears in the infinity direction, the state in which the focus is on the close side (front side) of the in-focus position is determined to be the "front focus state." In a case where the defocus amount larger than the in-focus determination threshold appears in the close direction, it is determined that the focus is on the infinity side (rear side) of the in-focus position, and that the state is the "rear focus state." In addition to the three states of the "in-focus state," the "front focus state," and the "rear focus state," a "bokeh state" indicating that the image is blurred may be determined in a case where the calculated reliability is low or in a case where the defocus amount exceeds a predetermined threshold (such as a defocus value equivalent to five times as large as the depth of field) defocus amount). This embodiment determines the focus state to be the "front focus state" or the "rear focus state" in a case where the calculated defocus amount is larger than the in-focus determination threshold, but the focus state is not determined to be the "bokeh state."

The depth of field that serves as a reference for the in-focus determination threshold is determined according to the state of the imaging optical system such as the zoom lens 102, the focus lens 105, or the diaphragm 103. In general, a range of the in-focus determination is wider as a focal length becomes shorter, an imaging distance (distance between the object and the camera) becomes longer, and an F-number (aperture value) becomes larger. This embodiment changes the in-focus determination threshold for the defocus amount according to the depth of field. For example, in a case where the depth of field is larger than a predetermined value, the in-focus determination threshold for the defocus amount is set to a value smaller than that where the depth of field is small. This is because if the in-focus determination threshold is fixed, most of the phase-difference detecting frames are determined to be the "focus state," the "front focus state," and the "rear focus state" under wide-angle and narrowed-down conditions that increase the depth of field. Changing the in-focus determination threshold can prevent the MF assisting frame or the MF assisting subframe described in step S603 and subsequent steps from being displayed on an area other than the object aimed by the user, such as the entire screen, and the visibility from deteriorating.

The determining ranges for the "in-focus state," the "front focus state," and the "rear focus state" may be changed according to the camera setting obtained in step S301 in FIG. 3 as well as the depth of field. For example, the in-focus determination threshold may be selected from among "wide," "narrow," "linked to the recorded size" in the camera setting menu, and the predetermined ratio may be changed according to this setting. This embodiment acquires, as the detection information, frame number information indicating how many frames there are for each focus state together with the focus state.

Figures 8A, 8B:
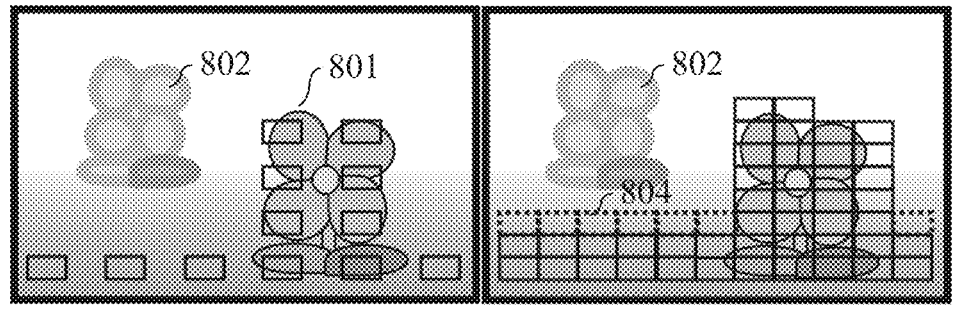
FIGS. 8A to 8F explain the display of MF assisting frames and MF assisting subframes in this embodiment.
Figures 8C, 8D:
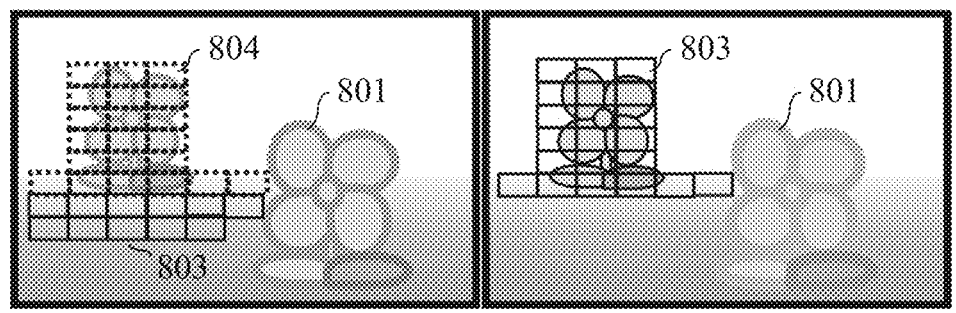
Figures 8E, 8F:
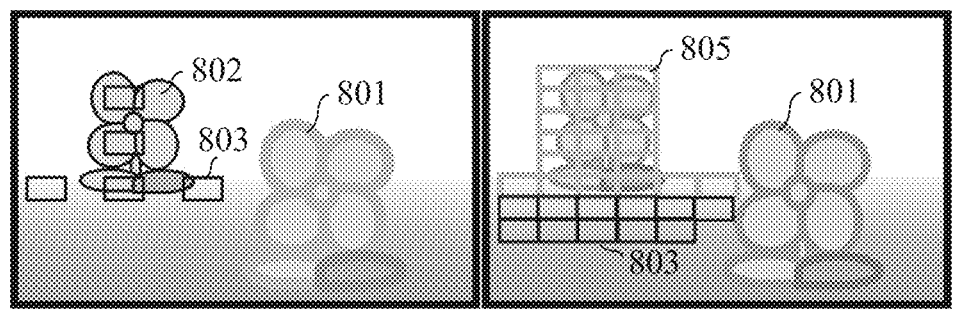

Referring now to FIGS. 8A to 8F, a description will be given of the MF assisting frames and the MF assisting subframes as display items. FIGS. 8A to 8F explain the display of the MF assisting frames and the MF assisting subframes. FIGS. 8A to 8F illustrate the display state of the MF assisting frames and the MF assisting subframes in an attempt to focus on a back object 802 while a front object 801 is in focus using the MF operation toward the infinity direction. FIGS. 8A and 8E illustrate a state in which no MF operation is performed. FIGS. 8B, 8C, 8D, and 8F illustrate a state in which the MF operation is being performed. FIG. 8B illustrates a state just after the MF operation is started. FIG. 8C illustrates a state in which an area between the front object 801 and the back object 802 is in focus while the MF operation is being performed. FIG. 8D illustrates a state in which the back object 802 is in focus but the MF operation is still continued.

In FIGS. 8A to 8F, each rectangular frame 803 indicates an MF assisting frame, and each dotted-line frame 804 indicates an MF assisting subframe. The MF assisting frame indicates the in-focus position on the screen, and the MF assisting subframe indicates the almost (marginal) in-focus state (in the example of FIGS. 8A to 8F, since the MF operation is being performed in the infinity direction, the focus state is the front focus state) so as to visually indicate their positions to the user. A series of flows in FIGS. 8A to 8F is one of the characteristics according to this embodiment.

In a case where the MF operation is not being performed, the display density of the MF assisting frames is reduced and the visibility is secured in order to enable the focus state of the object to be easily confirmed by thinning out the MF assisting frames of the neighboring frames among the phase-difference detecting frames, by reducing the size of one frame, and by discretely displaying the neighboring frames, for example, by displaying the neighboring frames with gaps. That is, the visibility is secured by reducing the display ratio of the MF assisting frames per unit area. During the MF operation for focusing, the display density of the MF assisting frames is increased by displaying all neighboring MF assisting frames and by increasing the size of one frame to close the gap. That is, the display ratio occupied by the MF assisting frame per unit area is increased.

Thus, the camera control unit 119 changes the display state of the MF assisting frame as a display item according to the MF operation of the user. For example, the camera control unit 119 may set the display ratio to a first ratio in a case where the user is not performing the MF operation, and may set a second ratio higher than the first ratio in a case where the user is performing the MF operation. The camera control unit 119 may set the display number of the MF assisting frames to a first display number in a case where the user is not performing the MF operation, and may set the display number of the MF assisting frames to a second display number larger than the first display number in a case where the user is performing the MF operation. The camera control unit 119 may set the display gap of the MF assisting frames to a first gap in a case where the user is not performing the MF operation, and may set the display gap of the MF assisting frames to a second gap narrower than the first gap in a case where the user is performing the MF operation. Thereby, a focus assisting function can be realized that enables the user to visually recognize changes in the in-focus position associated with focus changes, and perceive a remaining amount of the MF operation to make the targeted object in focus.

This embodiment indicates the MF assisting frame as a display item by the rectangular frame 803 and the MF assisting subframe as a display item by the dotted-line frame 804, but is not limited to this example. For example, as in MF assisting subframes 805 in FIG. 8F, this embodiment may change the attribute such as a frame color (display color), transparency, and thickness between the MF assisting frame and the MF assisting subframe, and a frame shape, such as a key shape, for one of the MF assisting frame and the MF assisting subframe. This embodiment may make different the MF assisting frame and the MF assisting subframe according to the camera setting acquired in step S301 of FIG. 3. This embodiment may enable a frame color (first color or second color) and a shape (first shape or second shape) to be selected: For example, the MF assisting frame may be set to a green rectangular frame and the MF assisting frame may be set to a yellow rectangular frame.

Now back to FIG. 6, a description will be given of the flow after step S602. In step S602, the camera control unit 119 determines whether or not there is a focusing operation using a focus ring (not illustrated) on the lens operation unit 110, a focusing operation button (not illustrated) on the camera operation unit 120, or the like. In a case where there is a focusing operation, the flow proceeds to step S603. In a case where there is no focusing operation, the flow proceeds to step S604.

In step S603, the camera control unit 119 turns on a flag (MF assisting frame display flag) indicating whether or not to display the MF assisting frames for all of the phase-difference detecting frames in the "in-focus state" acquired in step S601. In step S604, the camera control unit 119 turns on the MF assisting frame display flag for part of the phase-difference detecting frames in the "in-focus state" acquired in step S601. This embodiment thins out and displays neighboring MF assisting frames of the phase-difference detecting frames, but is not limited to this example. As long as the visibility is secured during the focus confirmation, another method of lowering the display density of the MF assisting frames (reducing the ratio of the MF assisting frames per unit area) may be used. For example, this embodiment can use a method of thinning out and discretely displaying the MF assisting frames or a method of reducing the size of each frame and displaying the frames with a gap.

The MF assisting frame and the MF assisting subframe may not match the size of the phase-difference detecting frame. For example, in a case where the MF operation is not being performed in a large number of divisions, such as the phase-difference detecting frames 402 in FIG. 4C, the visibility may be secured by displaying four frames (a plurality of display items) that are vertically and horizontally adjacent to one another. Moreover, in a case where the MF operation is being performed, a plurality of frames may be displayed without being combined.

In step S605, the camera control unit 119 determines whether or not the number of frames determined to be "in focus" (the number of in-focus frames) among the detection information acquired in step S601 is smaller than a predetermined number Nth. In a case where it is determined that the number of frames is smaller than the predetermined number Nth, the flow proceeds to step S606. In a case where it is determined that the number of frames is larger than the predetermined number Nth, the flow proceeds to step S609. The reason why whether or not to perform the processing of steps S606 to S608 is changed according to the number of focusing frames will be described below.

In step S606, the camera control unit 119 determines whether or not the focusing operation is performed in the infinity direction. In a case where it is determined that the focusing operation is performed in the infinity direction, the flow proceeds to step S607. In a case where it is determined that the focusing operation is performed in the close direction, the flow proceeds to step S608.

In step S607, the camera control unit 119 turns on a flag (MF assisting subframe display flag) indicating whether or not to display the MF assisting subframe in the phase-difference detecting frame determined to be in the "front focus state." In step S608, the camera control unit 119 turns on the MF assisting subframe display flag of the phase-difference detecting frame determined to be in the "rear focus state." That is, the camera control unit 119 sets the range of the in-focus degree as the display state of the display item to a first range in a case where the user is not performing the MF operation, and sets the range of the in-focus degree to a second range wider than the first range in a case where the user is performing the MF operation.

This embodiment displays the MF assisting subframe in either the "front focus state" or the "rear focus state" depending on the focusing operation direction. In addition to a position in an "in-focus state," a position in an "almost in-focus state" may be recognized. If the MF assisting subframe is displayed on the bokeh frames, the screen becomes so crowded that focusing becomes difficult. However, this embodiment is not limited to this example. This embodiment may always display the MF assisting subframes in the "front focus state" and "rear focus state" regardless of the focusing operation method, and may change the frame color and frame shape so that the MF assisting subframes in the "front focus state" and "back focus state" can be distinguished.

The reason why steps S606 to S608 are not performed in a case where the number of in-focus frames is larger than the predetermined number Nth in step S605 is as follows. That is, in a case where the display density of the MF assisting frames is high, or in a case where there are many in-focus frames on the screen, it becomes easier to visually view a change in an in-focus position along with a focus change, and the user can perceive a remaining amount of the MF operation to make the targeted object in focus. Thus, even if the MF assisting subframe is not displayed, focusing becomes easier to some extent. In addition, in a case where there are many in-focus frames displayed on the screen, if the MF assisting subframes are also displayed, the screen may be crowded, and the visibility may deteriorate. In this embodiment, the camera control unit 119 determines whether or not to change the range of the in-focus degree according to the number of displayed MF assisting frames.

However, this embodiment is not limited to this example, and may set whether or not to display the MF assisting subframe by the menu setting or the like, and always display the MF assisting subframe regardless of the number of focusing frames. For example, in a case where the camera setting acquired in step S301 of FIG. 3 is a setting that does not always display the MF assisting subframes, step S605 is always established by setting the predetermined number Nth to a sum of the maximum number of phase-difference detecting frame 401 and 1 and thus the MF assisting subframe is displayed. Conversely, a setting that does not display the MF assisting subframes can be set by setting the predetermined number Nth to 0.

Figure 9A:
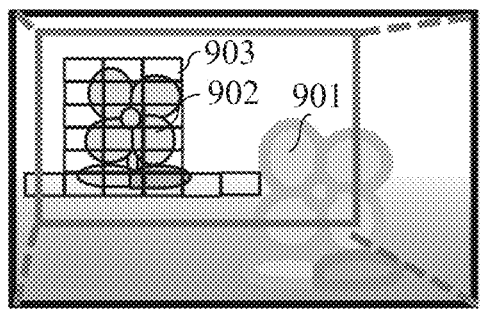
FIGS. 9A and 9B explain a display range of the MF assisting frames in this embodiment.
Figure 9B:
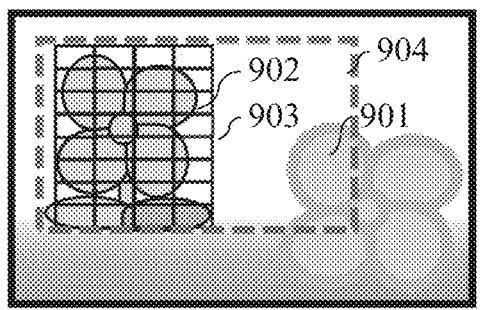

Referring now to FIGS. 9A and 9B, a description will be given of the display range of the MF assisting frame or MF assisting subframe. FIGS. 9A and 9B explain the display range of the MF assisting frame. FIG. 9A is a conceptual diagram illustrating the target angle of view (gray rectangular frame in the figure) after the zoom operation and the pan/tilt operation are combined with the current angle of view. FIG. 9B is a conceptual diagram illustrating the setting range of the MF assisting frame while the zoom operation and the pan/tilt operation are being performed toward the target angle of view. Similarly to FIG. 8D, FIGS. 9A and 9B, schematically illustrate a state in which the MF operation has been performed in the infinity direction from a front object 901, and a back object 902 is in focus, but the MF operation is still being continued. FIG. 9B illustrates that the display range of the MF assisting frame 903 is limited to a display range (dotted-line frame) 904 instead of the entire screen in a case where the zoom operation and the pan/tilt operation are also combined. During zooming to the telephoto side (that is, during enlargement), an object in the peripheral portion of the screen becomes out of the angle of view, so the display range 904 of the MF assisting frame may be limited to the central portion of the screen. Even in the pan/tilt operation, the object in the direction opposite to the pan/tilt direction becomes out of the angle of view, so the display range 904 of the MF assisting frame may be shifted in the pan/tilt direction.

Now back to FIG. 6, the flow after step S609 will be described. In step S609, the camera control unit 119 determines whether there is a zoom operation to the telephoto side, using the zoom ring (not illustrated) on the lens operation unit 110, the zoom operation button (not illustrated) on the camera operation unit 120, and the like. In a case where there is the zoom operation to the telephoto side, the flow proceeds to step S610. In a case where there is no zoom operation or there is a zoom operation to the wide-angle side, the flow proceeds to step S611. In step S610, the camera control unit 119 restricts the display range of the MF assisting frame by setting it to a small size because the object in the peripheral portion of the screen becomes out of the angle of view in a case where the zoom operation is performed to the telephoto side as described above. That is, the camera control unit 119 changes the display range of the MF assisting frames according to the zoom operation of the user.

Next, in step S611, the camera control unit 119 determines whether or not there is a pan/tilt operation (panning operation or tilting operation) of the camera body 111. This determination is made based on an output from a gyro sensor (not illustrated) mounted on the lens unit 100 or the camera body 111, vector information detected from the video signal from the camera signal processing unit 114, and the like. In a case where there is the pan/tilt operation, the flow proceeds to step S612. In a case where there is no pan/tilt operation, this flow is terminated. In step S612, since the object in the direction opposite to the pan/tilt direction becomes out of the angle of view as described above, the camera control unit 119 shifts the display range 904 of the MF assisting frame in the pan/tilt direction and sets it. The display range 904 of the MF assisting frame may be set so as to expand the range in the pan/tilt direction instead of shifting in the pan/tilt direction. That is, the camera control unit 119 changes the display range of the MF assisting frame according to the panning operation or tilting operation of the user.

The shifting degree of the object from the angle of view changes depending on the speed of the zoom operation or the pan/tilt operation. Therefore, the setting of the display range 904 of the MF assisting frame may be changed according to the zoom speed and the pan/tilt speed. For example, in a case where the zoom speed is low or in a case where the pan/tilt speed is low, the display range 904 of the MF assisting frame is not particularly limited. In a case where the zoom speed is high, the display range 904 of the MF assisting frame may be reduced and limited. In a case where the pan/tilt speed is high, the display range of the MF assisting frame may be shifted or expanded in the pan/tilt direction.

The display ranges of the MF assisting frame and MF assisting subframe associated with the zoom operation and pan/tilt operation are not limited to the above methods. The MF assisting frame and MF assisting subframe may be always displayed on the entire screen regardless of zooming or panning/tilting operations by making settable the display range of the MF assisting frame through the menu setting, etc.

Figure 7:
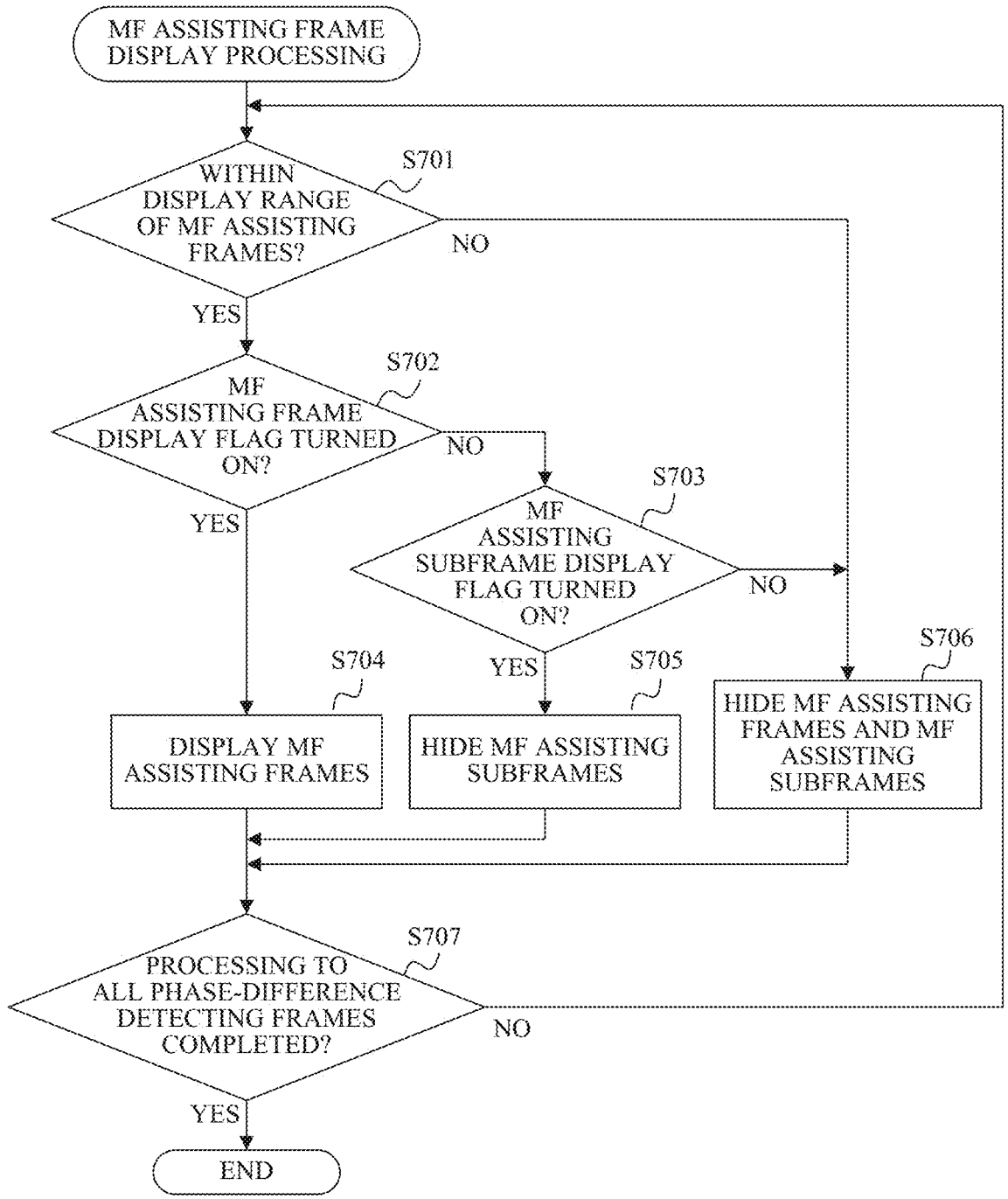
FIG. 7 is a flowchart illustrating MF assisting frame display processing according to this embodiment.

Referring now to FIG. 7, a description will be given of the MF assisting frame display processing in step S308 of FIG. 3. FIG. 7 is a flowchart illustrating MF assisting frame display processing.

First, in step S701, the camera control unit 119 determines whether each phase-difference detecting frame 401 is within the display range (display range 904 illustrated in FIG. 9B) of the MF assisting frame (and the MF assisting subframe) set in steps S610 and S612 of FIG. 6. In a case where each phase-difference detecting frame 401 is within the display range of the MF assisting frame, the flow proceeds to step S702. In a case where each phase-difference detecting frame 401 is outside the display range of the MF assisting frame, the flow proceeds to step S706.

In step S702, the camera control unit 119 determines whether or not the MF assisting frame display flag set in steps S603 and S604 of FIG. 6 is turned on. In a case where the MF assisting frame display flag is turned on, the flow proceeds to step S704. In a case where the MF assisting frame display flag is turned off, the flow proceeds to step S703.

In step S703, the camera control unit 119 determines whether the MF assisting subframe display flag set in steps S607 and S608 of FIG. 6 is turned on. In a case where the MF assisting subframe display flag is turned on, the flow proceeds to step S705. In a case where the MF assisting subframe display flag is turned off, the flow proceeds to step S706.

In step S704, the camera control unit 119 superimposes the MF assisting frames on the screen. In step S705, the camera control unit 119 superimposes the MF assisting subframes on the screen. In step S706, the camera control unit 119 hides (does not display) the MF assisting frames and the MF assisting subframes.

Next, in step S707, the camera control unit 119 determines whether or not the processing of steps S701 to S706 has been completed to all 121 phase-difference detecting frames set in step S302. In a case where the processing to all phase-difference detecting frames has not been completed, the flow returns to step S701, and the processing of steps S701 to S706 are repeated. In a case where the processing to all the phase-difference detecting frames is completed, this flow ends.

A description has been given hitherto of the way of facilitating focusing during the MF operation and securing the visibility during the focus confirmation by changing the displays of the MF assisting frames and the MF assisting subframes according to the MF operation. However, in practice, it takes a long time to detect a phase difference between imaging signals and to determine the focus state. In displaying the MF assisting frames and the MF assisting subframes corresponding to the determined focus state on the display unit 115 such as an external monitor (not illustrated), there is a delay time from when the camera control unit 119 sends the frame information to the display unit 115 to when the notification is displayed. Hence, focusing on an object targeted by the user may become difficult without exceeding the focus position by simply displaying the focus assisting frame according to the phase-difference detecting result.

Figure 10:
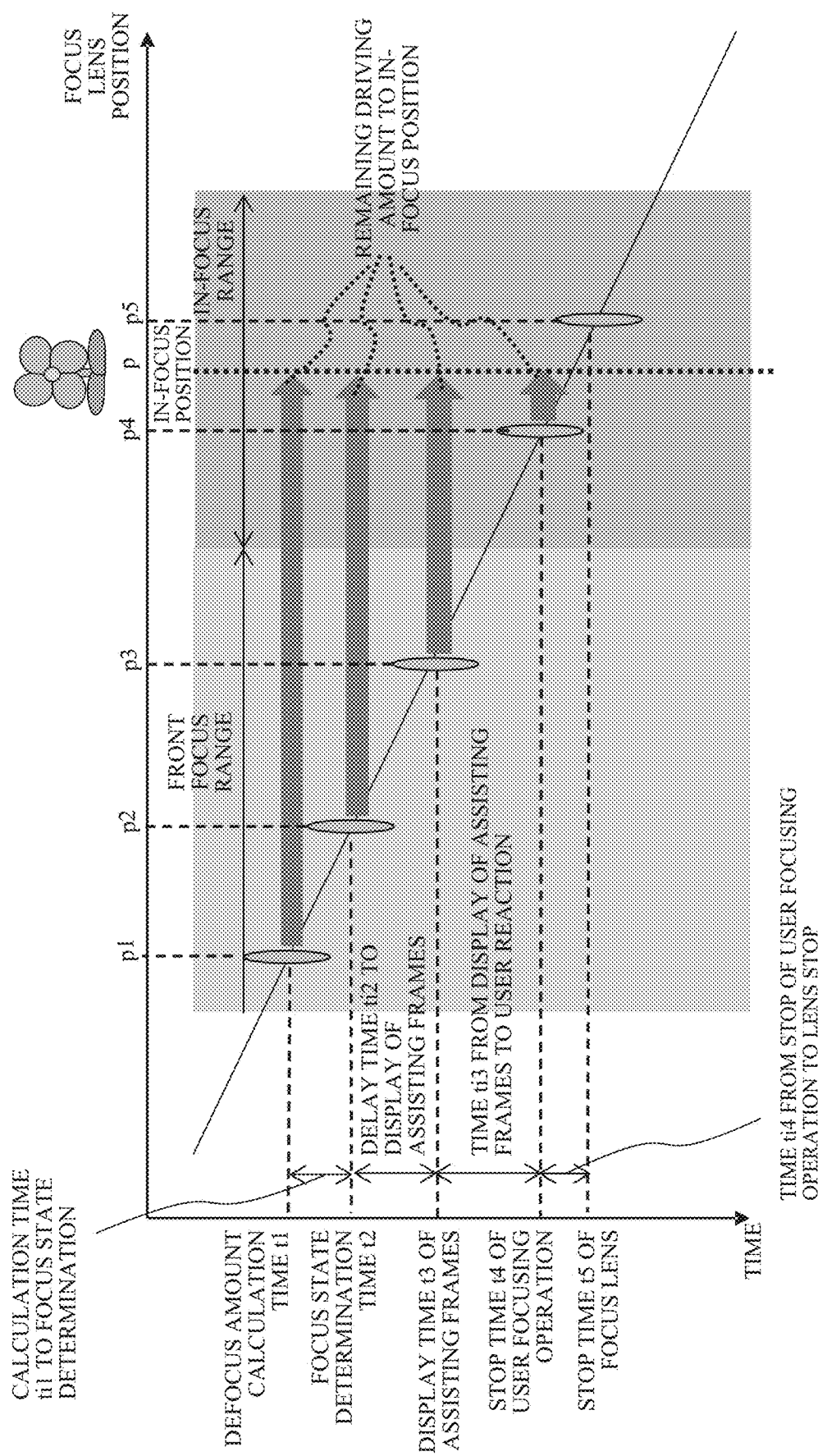
FIG. 10 explains the delay time until the assisting frame is displayed in this embodiment.

FIG. 10 explains the delay time until the assisting frame is displayed. In FIG. 10, a horizontal axis indicates a focus lens position p, and a vertical axis indicates time. FIG. 10 illustrates a relationship between a focus lens position and elapsed time in a case where the object 802 in FIGS. 8A to 8F is to be focused by the MF operation, and a relationship between the range of the "in-focus state" (in-focus range) and the range of the "front focus state" (front focus range). The focus lens position p indicates the position of the focus lens in a case where the object 802 is in focus.

This embodiment displays the MF assisting frames and the MF assisting subframes by determining the focus state based on the calculated defocus amount and defocus direction, but is not limited to this example. Here, for better understanding, the displays of the MF assisting frames and the MF assisting subframes may be set based on the relationship between the focus state and the time change of the remaining driving amount of the focus lens to the in-focus position, which is calculated based on the defocus amount and the defocus direction. Therefore, the remaining driving amount of the focus lens up to the in-focus position will be used for the description. For simplified description, this embodiment assumes that the driving amount of the focus lens by the MF operation is a constant speed.

A focus lens position p1 indicates a focus lens position at time t1 in a case where the defocus amount is calculated in the phase-difference detecting processing in step S303 of FIG. 3. A remaining focus driving amount up to the in-focus position at time t1 is p−p1. A focus lens position p2 indicates a focus lens position at time t2 in a case where the focus state is determined in the MF assisting frame setting processing of step S304 in FIG. 3 and the MF assisting frame display flag is set based on this determination result. A period from the time t1 when the defocus amount is calculated to the time t2 when the focus state is determined corresponds to calculation time ti1 for the focus state determination. Therefore, the focus lens moves by p2-p1 during the calculation time ti1. The remaining focus driving amount up to the in-focus position at time t2 is p-p2.

A focus lens position p3 indicates a focus lens position at time t3 when the assisting frame is displayed on the screen of the display unit 115. There is delay time ti2 from the time t2 when the camera control unit 119 determines the focus state to the time t3 when the assisting frame is actually displayed on the display unit 115 due to the communication delay time for notifying information on the display of the assisting frame to the display unit 115, and the response time of the display unit 115 itself. Therefore, the focus lens moves by p3-p2 during the delay time ti2. The remaining focus driving amount up to the in-focus position at time t3 is p-p3, but the assisting frame displayed at time t3 is displayed based on the focus state at the time t1 when the defocus amount is calculated. When the user visually perceives the assisting frame display, the focus driving amount p3-p1 during the calculation time ti1 and the delay time ti2 is not considered.

The user stops the MF operation after viewing the assisting frames displayed on the display unit 115, but it is expected that it takes time ti3 from time t3 when the assisting frames are displayed to time t4 when the user reacts to the display and actually stops the focusing operation. Even in a case where the user stops the focusing operation, there is actually an idle running time ti4 from when the focus lens decelerates to when it stops at time t5. Therefore, in order to stop the focus lens at the in-focus position p or within the in-focus range, the user is previously informed of the "in-focus state."

This embodiment displays the remaining focus driving amount up to the in-focus position for displaying the assisting frames and the assisting subframes, that is, the defocus amount by subtracting a moving amount during a period of a sum of the calculation time ti1, the delay time ti2, the time ti3, and the idle running time ti4. The calculation time ti1 and the idle running time ti4 are determined according to the configuration of the imaging system 10 that includes the lens unit 100 and the camera body 111. Hence, a predetermined value is set based on the previously measured time or the like. The delay time ti2 is determined according to the communication system between the camera control unit 119 and the display unit 115 and the responsiveness of the display unit 115. Therefore, the predetermined value is set based on the previously measured time. Alternatively, in a case where the camera body 111 is connected to an external monitor or the like, the delay time varies depending on the connected monitor, so a menu setting may be provided so that the user can specify the delay time. Since the time ti3 from when the user views the display to when the user reacts to it differs from person to person, the user may be able to specify it.

As described above, the camera control unit 119 can change the display of the display item according to the focus control amount by the MF operation by acquiring a first offset amount for the focus detection result, and by subtracting the first offset amount from the focus detection result. The camera control unit 119 may change the display of the display item by acquiring a second offset amount according to a display delay amount of the display item on the display unit 115, and by subtracting the second offset amount from the focus detection result. The camera control unit 119 may change the display of the display item by acquiring a third offset amount set by the user and by subtracting the third offset amount from the focus detection result.

As described above, this embodiment secures the visibility by lowering the display density of the MF assisting frames in order to make it easier to check the focus state of the object in a case where no MF operation is being performed. During the MF operation for focusing, the display density of the MF assisting frames is increased. Thereby, the user can visually recognize changes in the in-focus position along with focus changes, and perceive a remaining amount of the MF operation to make the targeted object in focus. This embodiment can provide a focus assisting display apparatus that can achieve improved focusing operability during the MF operation and secured the visibility during focus confirmation of an object.

A description will be given of the control relating to the AF display in steps S306 to S308 of FIG. 3. Referring now to FIG. 13, a description will be given of the AF frame display menu that can be set in step S301. FIG. 13 explains the AF frame display menu. In this embodiment, the AF frame display menu has three patterns: (A) limited display of AF assisting frames, (B) display of connected AF assisting frame, and (C) full display of AF assisting frames. In a case where the "focusing operation during AF" is performed, the AF target area is displayed and notified while the MF operation is stopped, and the MF assisting frame for the MF operation is displayed. Each characteristic will be described below.

(A) Limited Display of AF Assisting Frames

AF assisting frames 1301 are displayed "during AF." The AF assisting frames 1301 are displayed in the AF target area. In the "focusing operation during AF," MF assisting frames 1302 are displayed. The MF assisting frames 1302 are displayed in the AF target area when the MF operation is stopped. Beneficially, there is no display difference between "during AF" and "focusing operation during AF," and MF and AF are seamlessly connected. However, in a case where the "focusing operation during AF" is performed, the MF assisting display area is so small that the targeted object may not be focused by the MF operation.

(B) Display of Connected AF Assisting Frame

"During AF," an AF assisting frame 1303, which is made by connecting the AF assisting frames, is displayed in the AF target area. In a case where the "focusing operation during AF" is performed, MF assisting frames 1305 are displayed on the full screen. An AF frame 1304 is superimposed on the AF targeted area when the MF operation is stopped. Beneficially, in a case where the "focusing operation during AF" is performed, the MF assisting frames are displayed on the entire surface during the MF operation, and it is highly likely that a targeted object can be focused by the MF operation. In addition, since the MF display and the AF display have different shapes, the operability of the user can be improved. However, both the MF and the AF are displayed in the "focusing operation during AF," the visibility of the object may be lowered.

(C) Full Display of AF Assisting Frames

"During AF," AF assisting frames 1306 are displayed on the entire partial area as the in-focus portion of the screen. In a case where the "focusing operation during AF" is performed, MF assisting frames 1308 are displayed on the full screen. An AF target area 1307 is notified to the user by changing the shape of the MF assisting frame. Beneficially, since the in-focus frames can be displayed even "during AF," the user can confirm an in-focused state of an arbitrary object. However, since in-focus frames are displayed in the entire area "during AF," it may be difficult to recognize an object as the AF target. In addition, in a case where the AF target area is notified by changing the shape of the MF assisting frame in the "focusing operation during AF," the user may not be able to recognize it depending on the shape. For example, in a case where the MF assisting frame is displayed as a solid-line rectangle, the MF assisting frame in the AF target area can be distinguished by changing a line width, the number of lines, the solid line into a dotted line, or the size, but this embodiment is not limited to this example.

Referring now to FIGS. 14A to 14H, a description will be given of display control in a case where (B) display of a connected AF assisting frame is selected as an example among the three patterns. FIGS. 14A to 14H explain the AF assisting frames and the MF assisting frames.

FIG. 14A illustrates the in-focus state on an object A1401 during AF in a scene where the object A1401 and object B1402 exist. FIG. 14B illustrates the start of the MF operation for focusing on the object B1402 from the in-focus state on the object A1401. FIG. 14C illustrates the end of the MF operation where the in-focus position has been moved to the object B1402. FIG. 14D illustrates the resume of AF with the object B1402. FIGS. 14E to 14H illustrate different display variations. FIG. 14A illustrates a connected AF frame 1403 on the object A1401. When the MF operation is started, the screen transitions to FIG. 14B, in which MF assisting frames 1405 are displayed, and a connected AF frame 1404 indicating the AF target area is displayed if the MF operation is finished. In a case where the user performs the MF operation relying on the MF assisting frames 1405 and moves the in-focus position to the object B1402, the screen transitions to FIG. 14C. During the MF operation, the MF assisting frames 1405 and 1407 have in-focus display, front blur display, back blur display, or the like, as described in steps S603 to S608. Therefore, the MF operability is improved, and the user can smoothly focus on the targeted object B1402.

The user confirms that a connected AF frame 1406 indicating the AF target area is displayed on object B1402, which is the targeted object, and ends the MF operation. Thereby, the state transitions to FIG. 14D, in which a connected AF frame 1408 is displayed on the object B1402 and AF resumes. Thus, in a case where the "focusing operation during AF" is performed, the operability of the user improves for both the MF and AF through the "display of the AF target area when the MF operation is stopped," and the "display of the MF assisting frames for the MF operation."

As a display pattern different from that described above, in step S301, the camera settings may be made changeable of (C) "display/non-display of AF frame" "during AF" and (D) "display/non-display of AF subframe" in the "focusing operation during AF". (C) is for users who do not need display during AF, and (D) is for users who wish to select an AF target area from a plurality of areas.

FIG. 14E illustrates the "non-display of the AF frame" during AF. The connected AF frame 1403 is hidden. Thereby, the visibility of the object during AF is improved. FIG. 14F illustrates a state at the start of the MF operation. In this state, a connected AF frame 1404 and MF assisting frames 1405 are displayed in and around the AF target area. FIG. 14G illustrates the "display of AF subframes" at the end of the MF operation. In a case where there are a plurality of in-focus frames, a primary AF frame (AF main frame) and a secondary AF frame (AF subframe) are determined according to the continuous areas and positions of the in-focus frames. In this case, the primary AF frame is the connected AF frame 1406 and the secondary AF frame is the AF frame 1409. The user can select the primary AF target area and secondary AF target area using the camera operation unit or the like. Thereby, the object selection freedom expands, and the AF operability can be improved. Similarly to FIG. 14E, FIG. 14G illustrates the "non-display of the AF frame" during AF, in which a connected AF frame 1408 is hidden.

Figure 11:
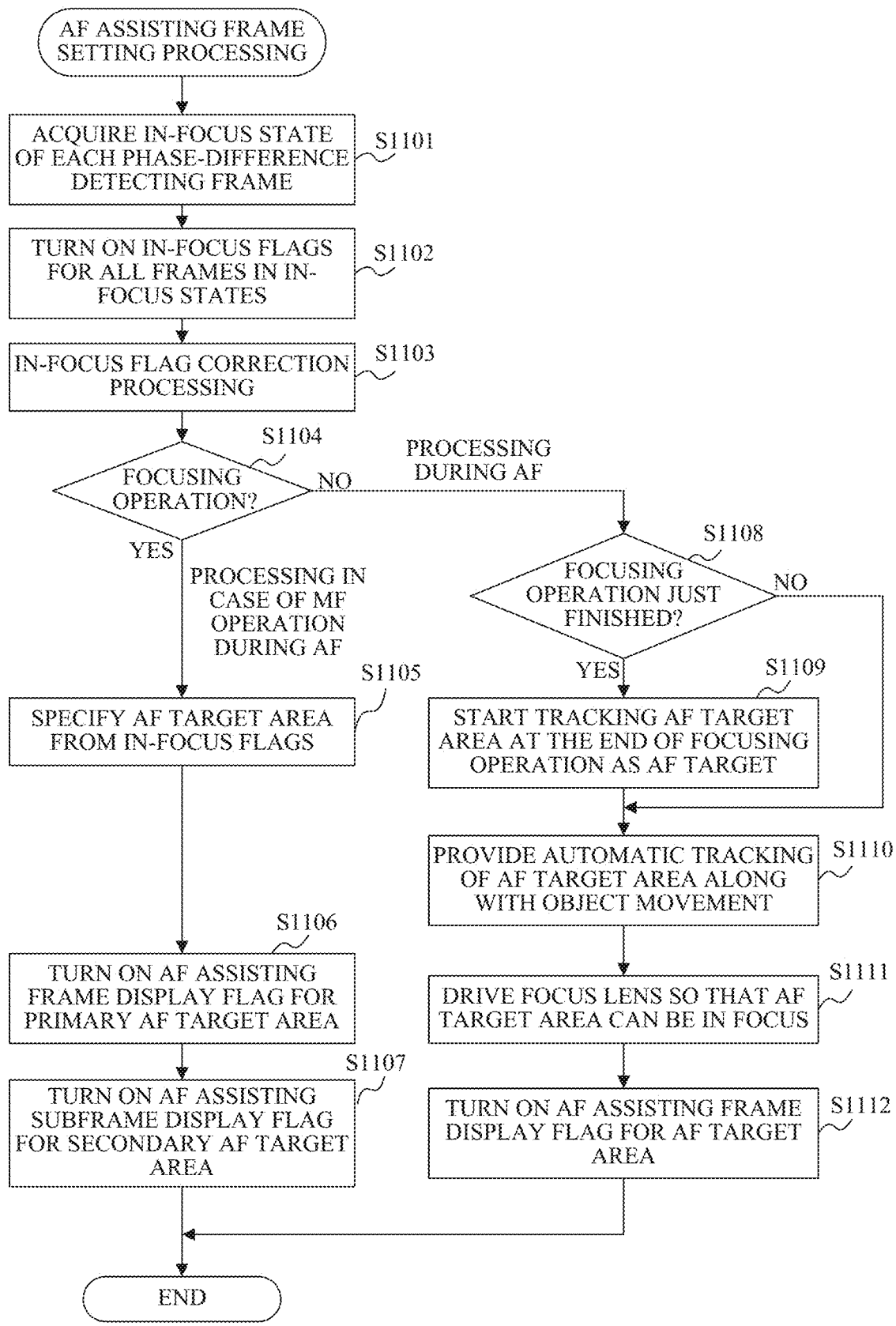
FIG. 11 is a flowchart illustrating AF assisting frame setting processing according to this embodiment.

Referring now to FIG. 11, a description will be given of the AF assisting frame setting processing in step S307. FIG. 11 is a flowchart illustrating the AF assisting frame setting processing.

First, in step S1101, the camera control unit 119 acquires the in-focus state of each phase-difference detecting frame. Next, in step S1102, the camera control unit 119 turns on the in-focus flag for all frames determined to be in focus. Next, in step S1103, the camera control unit 119 performs in-focus flag correction processing. This processing is processing of correcting a frame with missing an in-focus flag and an isolated in-focus flag in a matrix-shaped focus detection result as illustrated in FIGS. 4A, 4B, and 4C. The in-focus flag correction processing is performed so as to treat, as a connected surface, frames having turned on in-focus flags as many as possible.

The order of priority of objects to be the AF target includes conditions such as an object having a large area and the center of gravity of the area being located at the center of the screen. Correcting the in-focus flag can improve the localizing accuracy of the AF target. For example, a method of correcting a frame with a missing in-focus flag includes a method of monitoring the presence or absence of in-focus flags in four adjacent frames in the up, down, left, and right directions of a frame whose in-focus flag is turned off (central correction candidate frame). In this method, in a case where the in-focus flags for three or more frames are turned on, the missing portion can be corrected by changing the frame (central correction candidate frame) whose in-focus flag is turned off so that the in-focus flag is turned on.

A method of correcting an isolated in-focus flag includes a method of monitoring the presence or absence of in-focus flags for four frames adjacent to each other in the up, down, left, and right directions of a frame whose in-focus flag is turned on (isolated candidate frame). In a case where at least two or more frames have in-focus flags that are not turned on, this method can perform processing for correcting isolated in-focus flags by changing the frame whose in-focus flag is turned on (isolated candidate frame) so that the in-focus flag is turned off. This correction method is illustrative, and another correction method may be used.

Next, in step S1104, the camera control unit 119 determines whether or not there is a focusing operation. In a case where there is a focusing operation, the flow proceeds to step S1105. In a case where there is no focusing operation, the flow proceeds to step S1108.

Steps S1105 to S1107 are processing in a case where the focusing operation is performed during AF. In step S1105, the camera control unit 119 specifies the AF target area from the in-focus flag. This processing counts the area of consecutive in-focus flags, sets the area with the largest area as the primary AF target area, and sets the area with the second largest area as the secondary AF target area. In a case where they have almost the same areas, the area whose center of gravity is close to the center of the screen may be set as the primary area. In a case where it is difficult to specify the area of the in-focus flag, the area may be divided using color information on the image, and the AF target area may be specified by the position of the center of gravity in the area, the area of the in-focus flag, or the like. In addition, this embodiment may set an area to be evaluated (5×5 frames, etc.), evaluate all in-focus states on the entire screen in that evaluation unit, count the number of frames whose in-focus flags are turned on, and set the largest frame close to the center to the AF target area. Even in a case where the AF target area cannot be specified by any of the above methods, the center of the screen may be set as the AF target area.

Next, in step S1106, the camera control unit 119 performs processing to turn on the AF assisting frame display flag for the specified, primary AF target area. Next, in step S1107, the camera control unit 119 performs processing to turn on the AF assisting subframe display flag for the specified, secondary AF target area, and ends this flow.

As described above, the camera control unit 119 changes the display of display items in a case where the user is performing the MF operation during AF. In a case where the user is performing the MF operation during AF, the camera control unit 119 may superimpose an AF frame indicating an AF target range for focus control by AF and a display item. The camera control unit 119 may display a display item in an AF target range where focus control is performed by AF in a case where the user is performing the MF operation during AF.

Steps S1108 to S1112 are processing during AF. In step S1108, the camera control unit 119 determines whether or not it is just after the end of the focusing operation. In a case where the focusing operation has just ended, the flow proceeds to step S1109. In a case where it is not just after the focusing operation ends, the flow proceeds to step S1110. In step S1109, the camera control unit 119 starts tracking the AF target area at the end of the focusing operation as the AF target during AF.

Next, in step S1110, the camera control unit 119 automatically tracks the AF target area as the object moves. Automatic tracking can be realized using the known technology. For example, this embodiment may acquire the in-focus state of each phase-difference detecting frame, monitor the vicinity of the AF target area, and repeatedly move the AF target area to the detecting frame closest to the in-focus state. Thereby, the AF area can track the object movement on the screen. Alternatively, this embodiment can provide automatic tracking using color information in addition to the in-focus state of the phase-difference detecting frame. Tracking becomes available by storing as a tracking source image an image of the AF target area at the end of the focusing operation, by performing when a new image is obtained, pattern matching between the new image and the tracking source image, and by selecting part with the highest correlation as the AF target area.

Next, in step S1111, the camera control unit 119 drives the focus lens so that the AF target area is in focus. Next, in step S1112, the camera control unit 119 performs processing to turn on the AF assisting frame display flag in the AF target area, and ends the control. This processing is processing for displaying a frame in the AF area during AF. The secondary AF frame is not displayed during AF because it is sufficient to display the AF frame only for the object for which the in-focus state is to be maintained.

Figure 12A:
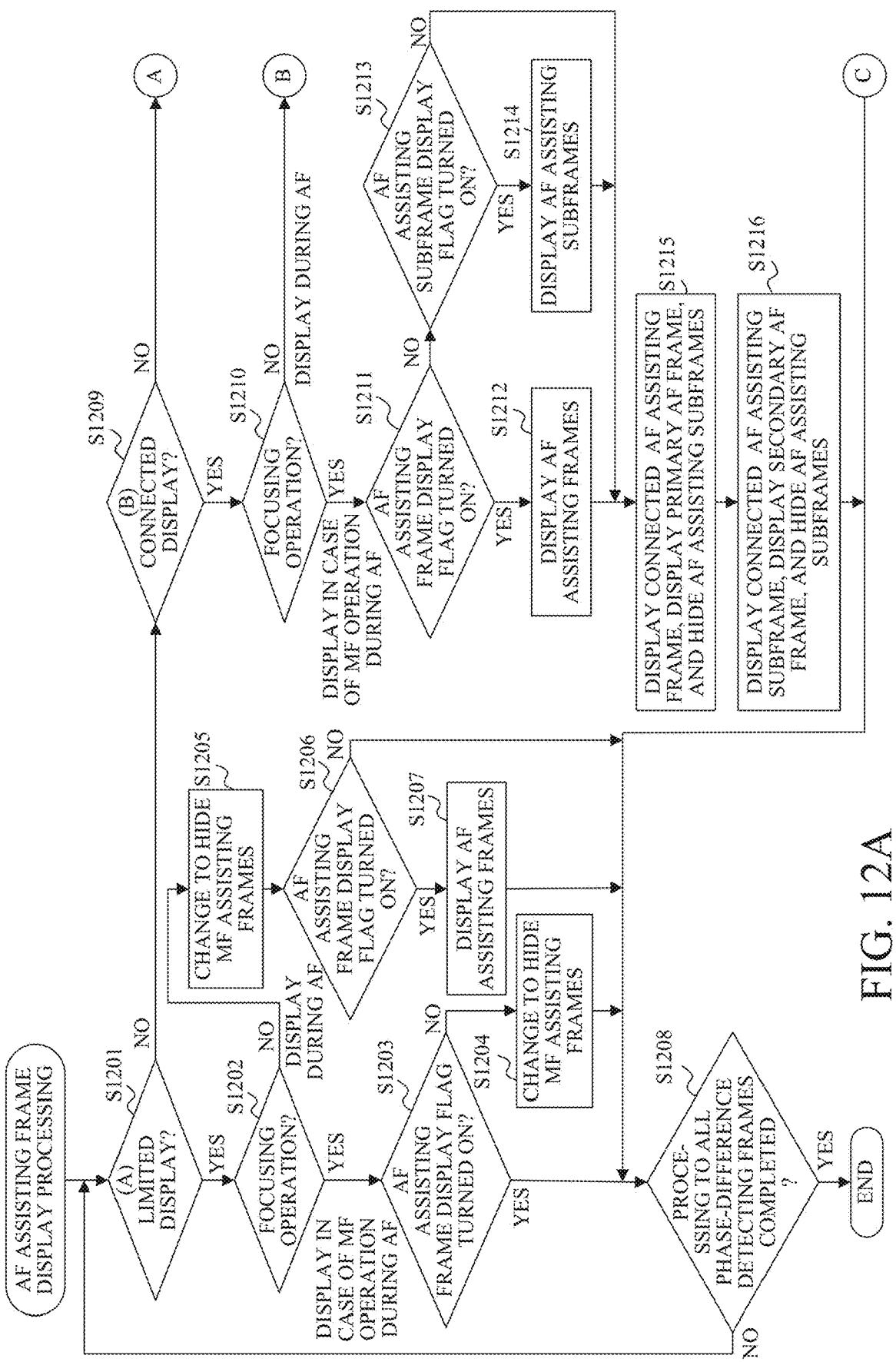
FIGS. 12A and 12B are flowcharts illustrating AF assisting frame display processing according to this embodiment.
Figure 12B:
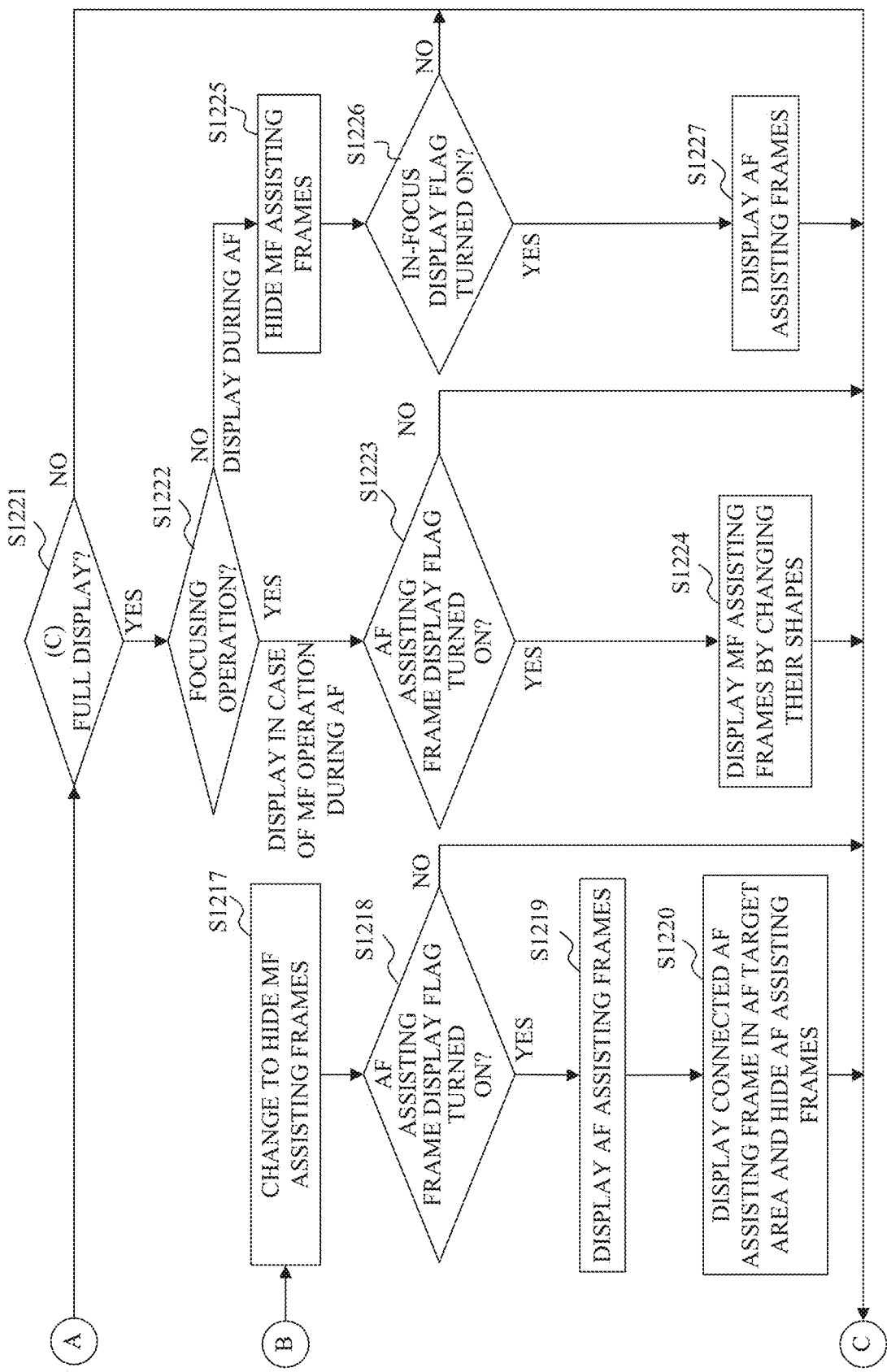

Referring now to FIGS. 12A and 12B, a description will be given of the AF assisting frame display processing in step S308. FIGS. 12A and 12B are flowcharts illustrating the AF assisting frame display processing. This processing is divided into three types according to the display types described with reference to FIG. 13: (A) limited display of an AF assisting frame, (B) display of a connected AF assisting frame, and (C) full display of an AF assisting frame. This embodiment will discuss the above three types, but the effects of this embodiment can be obtained even with display methods other than the above display method, as long as two conditions of (1) displaying the AF target area when the MF operation is stopped and (2) displaying the assisting frames for the MF operation are satisfied.

First, in step S1201, the camera control unit 119 determines whether or not the camera setting in step S301 is (A) limited display of the AF assisting frame. In a case where the camera setting is (A) limited display of the AF assisting frame, the flow proceeds to step S1202. In a case where the camera setting is not (A) limited display of AF assisting frame, the flow proceeds to step S1209. In step S1202, the camera control unit 119 determines whether or not there is a focusing operation. In a case where there is the focusing operation, the flow proceeds to step S1203. In a case where there is no focusing operation, the flow proceeds to step S1205.

The processing in steps S1203 and S1204 is a mode in which the AF assisting frame is displayed in a case where the focusing operation is performed during AF. Therefore, the AF target area portion of the MF assisting frame is displayed, and the rest is hidden. In step S1203, the camera control unit 119 determines whether the AF assisting frame display flag is turned on. In a case where the AF assisting frame display flag is turned on, the flow proceeds to step S1208. In a case where the AF assisting frame display flag is not turned on, the flow proceeds to step S1204. In step S1204, the camera control unit 119 sets the non-display of the MF assisting frame, and the flow proceeds to step S1208.

Next, the processing of steps S1205 to S1207 is a mode in which only the AF assisting frame is displayed during AF. Therefore, the MF assisting frames are hidden and only the AF assisting frame in the AF target area is displayed. In step S1205, the camera control unit 119 hides the MF assisting frames. Next, in step S1206, the camera control unit 119 determines whether or not the AF assisting frame display flag is turned on. In a case where the AF assisting frame display flag is turned on, the flow proceeds to step S1207. In a case where the AF assisting frame display flag is not turned on, the flow proceeds to step S1208. In step S1207, the camera control unit 119 performs processing to display the AF assisting frame, and proceeds to step S1208.

In step S1209, the camera control unit 119 determines whether or not the camera setting in step S301 is (B) display of a connected AF assisting frame. In a case where the camera setting is (B) the display of the connected AF assisting frame, the flow proceeds to step S1210. In a case where the camera setting is not (B) the display of the connected AF assisting frame, the flow proceeds to step S1221. In step S1210, the camera control unit 119 determines whether or not there is a focusing operation. In a case where there is the focusing operation, the flow proceeds to step S1211. In a case where there is no focusing operation, the flow proceeds to step S1217.

The processing of steps S1211 to S1216 is a mode for displaying an AF frame connecting the MF assisting frames and the AF assisting frame in a case where the focusing operation is performed during AF. This is processing that displays the MF assisting frames as they are, and in addition, superimposes the AF frame. In step S1211, the camera control unit 119 determines whether the AF assisting frame display flag is turned on. In a case where the AF assisting frame display flag is turned on, the flow proceeds to step S1212. In a case where the AF assisting frame display flag is not turned on, the flow proceeds to step S1213. In step S1212, the camera control unit 119 displays the AF assisting frame, and the flow proceeds to step S1215. In step S1215, the camera control unit 119 displays the primary AF frame by connecting the AF assisting frames, and hides the AF assisting frame. Next, in step S1216, the camera control unit 119 connects and displays the AF assisting subframes to display the secondary AF frame, and hides the AF assisting subframes.

The processing in steps S1217 to S1220 is a mode for displaying a connected AF frame during AF. This is processing to hide the MF assisting frames and display only the connected AF frame. In step S1217, the camera control unit 119 hides the MF assisting frame. Next, in step S1218, the camera control unit 119 determines whether or not the AF assisting frame display flag is turned on. In a case where the AF assisting frame display flag is turned on, the flow proceeds to step S1219. In a case where the AF assisting frame display flag is not turned on, the flow proceeds to step S1208. In step S1219, the camera control unit 119 displays the AF assisting frame. Next, in step S1220, the camera control unit 119 displays the connected AF assisting frame in the AF target area and hides the AF assisting frames. The display processing of the connected AF assisting frame will be described below with reference to FIGS. 15A to 15E.

In step S1221, the camera control unit 119 determines whether the camera setting in step S301 is (C) full display of the AF assisting frame. In a case where the camera setting is (C) full display of the AF assisting frame, the flow proceeds to step S1222. On the other hand, in a case where the camera setting is not (C) full display of the AF assisting frame, the flow proceeds to step S1208. In step S1222, the camera control unit 119 determines whether or not there is a focusing operation. In a case where there is the focusing operation, the flow proceeds to step S1223. In a case where there is no focusing operation, the flow proceeds to step S1225.

The processing in steps S1223 and S1224 is a mode for changing the shapes of the MF assisting frames only for the MF assisting frame and the AF target area in a case where the focusing operation is performed during AF. Therefore, the MF assisting frames are displayed as they are, and in addition, the shape of the AF target area is changed. In step S1223, the camera control unit 119 determines whether or not the AF assisting frame display flag is turned on. In a case where the AF assisting frame is to be displayed, the flow proceeds to step S1224. On the other hand, in a case where the AF assisting frame is not to be displayed, the flow proceeds to step S1208. In step S1224, the camera control unit 119 changes and displays the shapes of the MF assisting frames, and proceeds to step S1208.

The processing of steps S1225 to S1227 is a mode for displaying frames that is in focus on the entire screen during AF. Therefore, this processing is processing that hides the MF assisting frames and displays only the in-focus AF assisting frame. In step S1225, the camera control unit 119 hides the MF assisting frames. Next, in step S1226, the camera control unit 119 determines whether the focus display flag set in step S1102 is turned on. In a case where the in-focus display flag is turned on, the flow proceeds to step S1227. In a case where the focus display flag is not turned on, the flow proceeds to step S1208. In step S1227, the camera control unit 119 performs processing for displaying the AF assisting frame, and proceeds to step S1208.

In step S1208, the camera control unit 119 determines whether the processing for all the phase-difference detecting frames has ended. In a case where the processing for all the phase-difference detecting frames has ended, the display processing is finished. On the other hand, in a case where the processing for all the phase-difference detecting frames has not yet ended, the flow proceeds to step S1201 to repeat the display processing.

Referring now to FIGS. 15A to 15E, a description will be given of (B) display of a connected AF assisting frame (steps S1209 to S1216) in FIG. 13. FIGS. 15A to 15E explain the display of the connected AF assisting frame.

Figure 15A:
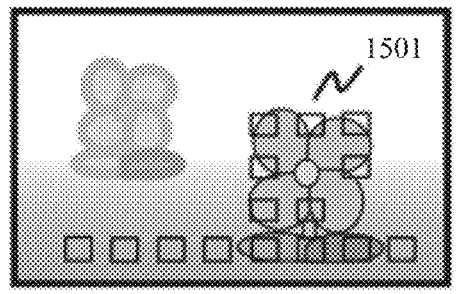
FIGS. 15A to 15E explain connected display of the AF assisting frame according to this embodiment.
Figure 15B:
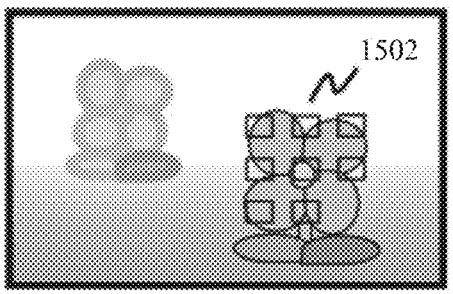
Figure 15C:
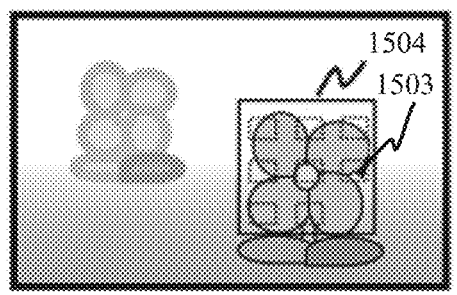

FIG. 15A illustrates AF assisting frames 1501 displayed in a portion where the in-focus flag set in step S1102 is turned on. FIG. 15B illustrates AF assisting frames 1502 displayed in a case where the AF assisting frame display flag is turned on only in the AF target area set in step S1106. FIG. 15C is a first example of the connected AF frame, and illustrates a primary AF frame 1504 that is made by connecting the AF assisting frames set in step S1215. This displays the connected primary AF frame so as to include all the AF assisting frames. In a case where the primary AF frame 1504 is displayed, the visibility improves where the AF assisting frame 1502 is hidden, so the AF assisting frames 1502 are changed to hidden AF assisting frames 1503.

Figure 15D:
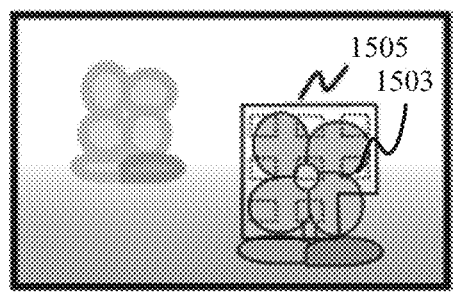
Figure 15E:
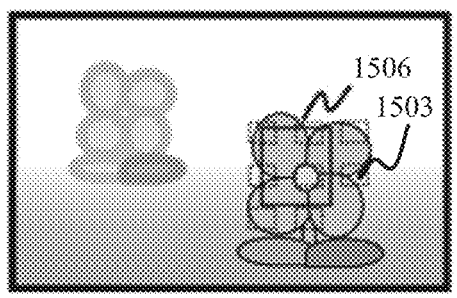

FIG. 15D is a second example of the connected AF frame, and illustrates a primary AF frame 1505 made by connecting the AF assisting frames set in step S1215. This connected display forms the primary AF frame so as to trace the outer circumference of the AF assisting frames. FIG. 15E is a third example of the connected AF frame, and illustrates a primary AF frame 1506 made by connecting the AF assisting frames set in step S1215. In this connected display, the center of the primary AF frame accords with the calculated center of gravity of the areas of the AF assisting frames. The AF frame size is variable according to the area.

This embodiment has presented three patterns of the connected display, but various display forms are available depending on the AF assisting frame. The connected display of the subframes in the AF area is displayed based on the AF assisting subframes, similarly to the primary AF frame. As described above, in a case where the "focusing operation during AF" is performed, this embodiment performs the "display of the AF target area when the MF operation is stopped" and the "display of the MF assisting frames for the MF operation," improving the operability of the user for both the MF and AF.

Each embodiment can provide a display control apparatus, a display control method, and a storage medium, each of which can improve the operability of focusing during MF operation and secure the visibility in confirming a focus state of an object. Applying focus assisting display during the MF operation during AF can provide seamless focus assisting display between AF and MF.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-109427, filed on Jul. 7, 2022, which is hereby incorporated by reference herein in its entirety.

What is claimed is:

1. A control apparatus configured to control a display unit configured to superimpose and display a captured image captured by an image sensor and display items indicating in-focus degrees of a plurality of focus detecting areas in the captured image, the control apparatus comprising:
a memory that stores a set of instructions; and
a processor configured to;
execute the set of instructions to change a display state of the display items according to a state of a manual focus operation by a user;
acquire an offset amount according to a focus control amount by the manual focus operation, and
change display of the display items by subtracting the offset amount from a focus detection result,
wherein the display state includes the offset amount for the focus detection result.

2. The control apparatus according to claim 1, wherein the processor is configured to:
determine whether or not a user is performing a manual focus operation; and
change the display state of the display items according to a determination result.

3. The control apparatus according to claim 1, wherein the display state includes a display ratio of the display items per unit area, and
wherein the processor is configured to:
set the display ratio to a first ratio in a case where the user is not performing the manual focus operation, and
set the display ratio to a second ratio higher than the first ratio in a case where the user is performing the manual focus operation.

4. The control apparatus according to claim 1, wherein the display state includes the display number of display items, and
wherein the processor is configured to:
set the display number to a first display number in a case where the user is not performing the manual focus operation, and
set the display number to a second display number larger than the first display number in a case where the user is performing the manual focus operation.

5. The control apparatus according to claim 1, wherein the processor is configured to:
display the display items indicating that the in-focus degrees are in-focus states on the display unit, and
thin out and displays on the display unit, part of the display items in a case where the user is not performing the manual focus operation.

6. The control apparatus, according to claim 1, wherein the processor is configured to:
display the display items indicating that the in-focus degrees are in-focus states on the display unit, and
connect the plurality of display items and display a connected display item on the display unit in a case where the user is not performing the manual focus operation.

7. The control apparatus according to claim 1, wherein the display state includes a display gap between the display items, and
wherein the processor is configured to:
set the display gap to a first gap in a case where the user is not performing the manual focus operation, and
set the display gap to a second gap narrower than the first gap in a case where the user is performing the manual focus operation.

8. The control apparatus according to claim 1, wherein the display state includes a range of the in-focus degrees of the display items, and
wherein the processor is configured to:
set the range to a first range in a case where the user is not performing the manual focus operation, and
set the range to a second range wider than the first range in a case where the user is performing the manual focus operation.

9. The control apparatus according to claim 8, wherein the processor is configured to determine whether or not to change the range according to the display number of display items.

10. The control apparatus according to claim 8, wherein the display state includes colors of the display items, and
wherein the processor is configured to:
set the colors to a first color in a case where the user is not performing the manual focus operation, and
set the colors to a second color different from the first color in a case where the user is performing the manual focus operation.

11. The control apparatus according to claim 8, wherein the display state includes shapes of the display items, and
wherein the processor is configured to:
set the shapes to a first shape in a case where the user is not performing the manual focus operation, and
set the shapes to a second shape different from the first shape in a case where the user is performing the manual focus operation.

12. The control apparatus according to claim 1, wherein the processor is configured to change a display range of the display items according to a zoom operation by the user.

13. The control apparatus according to claim 1, wherein the processor is configured to change a display range of the display items according to a panning or tilting operation by the user.

14. The control apparatus according to claim 1, wherein the processor is configured to change display of the display items in a case where the user is performing the manual focus operation during autofocus.

15. The control apparatus according to claim 14, wherein the processor is configured to display and superimpose an AF frame indicating an AF target range for focus control by the autofocus and the display items in a case where the user is performing the manual focus operation during the autofocus.

16. The control apparatus according to claim 14, wherein the processor is configured to display the display items in an AF target range for focus control by the autofocus in a case where the user is performing the manual focus operation during the autofocus.

17. A control method configured to control a display unit configured to superimpose and display a captured image captured by an image sensor and display items indicating in-focus degrees of a plurality of focus detecting areas in the captured image, the control method comprising:
 changing a display state of the display items according to a state of a manual focus operation by a user,
 acquiring an offset amount according to a focus control amount by the manual focus operation, and
 changing display of the display items by subtracting the offset amount from a focus detection result,
 wherein the display state includes the offset amount for the focus detection result.

18. A non-transitory computer-readable storage medium storing a program that causes a computer to execute the display control method according to claim 17.

19. An image pickup apparatus comprising:
 a display unit configured to superimpose and display a captured image captured by an image sensor and display items indicating in-focus degrees of a plurality of focus detecting areas in the captured image; and
 a control apparatus configured to control the display unit, wherein the control apparatus includes:
 a memory that stores a set of instructions, and
 at least one processor configured to:
 execute the set of instructions to change a display state of the display items according to a state of a manual focus operation by a user,
 acquire an offset amount according to a focus control amount by the manual focus operation, and
 change display of the display items by subtracting the offset amount from a focus detection result,
 wherein the display state includes the offset amount for the focus detection result.

* * * * *